United States Patent [19]
Satake et al.

[11] Patent Number: 5,784,373
[45] Date of Patent: Jul. 21, 1998

[54] SWITCHING DEVICE FOR LAN

[75] Inventors: Tadashi Satake; Seiichi Miyazaki; Mario Cardona, all of Kadoma, Japan

[73] Assignee: Matsushita Electric Works, Ltd., Osaka, Japan

[21] Appl. No.: 604,015

[22] Filed: Feb. 20, 1996

[30] Foreign Application Priority Data

Feb. 23, 1995 [JP] Japan ................................. 7-035741
Dec. 20, 1995 [JP] Japan ................................. 7-332130

[51] Int. Cl.$^6$ ............................. H04J 3/26; H04L 12/46
[52] U.S. Cl. ................................... 370/402; 370/447
[58] Field of Search ........................... 370/389, 392, 370/399, 400, 401, 402, 413, 414, 445, 447, 461, 462; 340/825.52; 395/200.02, 200.13

[56] References Cited

U.S. PATENT DOCUMENTS

| | | |
|---|---|---|
| 5,245,606 | 9/1993 | DeSouza ................................ 370/401 |
| 5,274,631 | 12/1993 | Bhardwaj .............................. 370/401 |
| 5,343,471 | 8/1994 | Cassagnol ............................. 370/401 |
| 5,379,289 | 1/1995 | DeSouza et al. ..................... 370/401 |
| 5,408,469 | 4/1995 | Opher et al. ......................... 370/401 |
| 5,477,547 | 12/1995 | Sugiyama ............................. 370/401 |

*Primary Examiner*—Alpus H. Hsu
*Attorney, Agent, or Firm*—Burns, Doane, Swecker & Mathis, L.L.P.

[57] ABSTRACT

A switching device for LAN is provided for switching packets in ETHERNET. The switching device includes an arrangement for storing the packet received at one of a plurality of receiving ports respectively connected to ETHERNET segments in a receiving buffer commonly used by the whole of the device, by means of a storage device of the receiving buffer. A transmitting destination port for the packet is determined through the use of an address filter device also common for the whole device. A transmitting buffer includes a storage device which receives the packet from the receiving buffer. Then, the packet is transferred from the storage device of the transmitting buffer to one of a plurality of transmitting ports corresponding to the determined address.

10 Claims, 25 Drawing Sheets

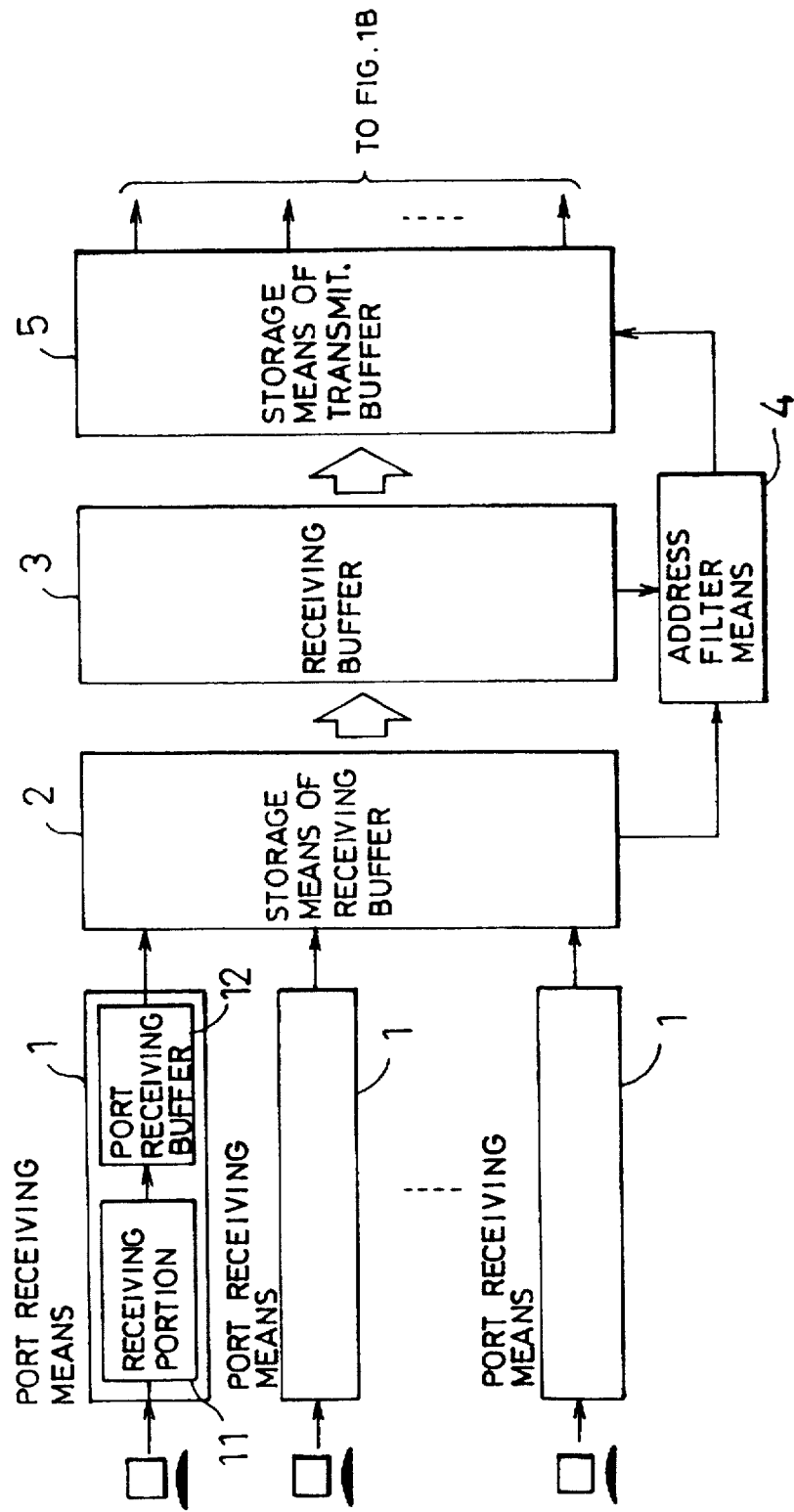

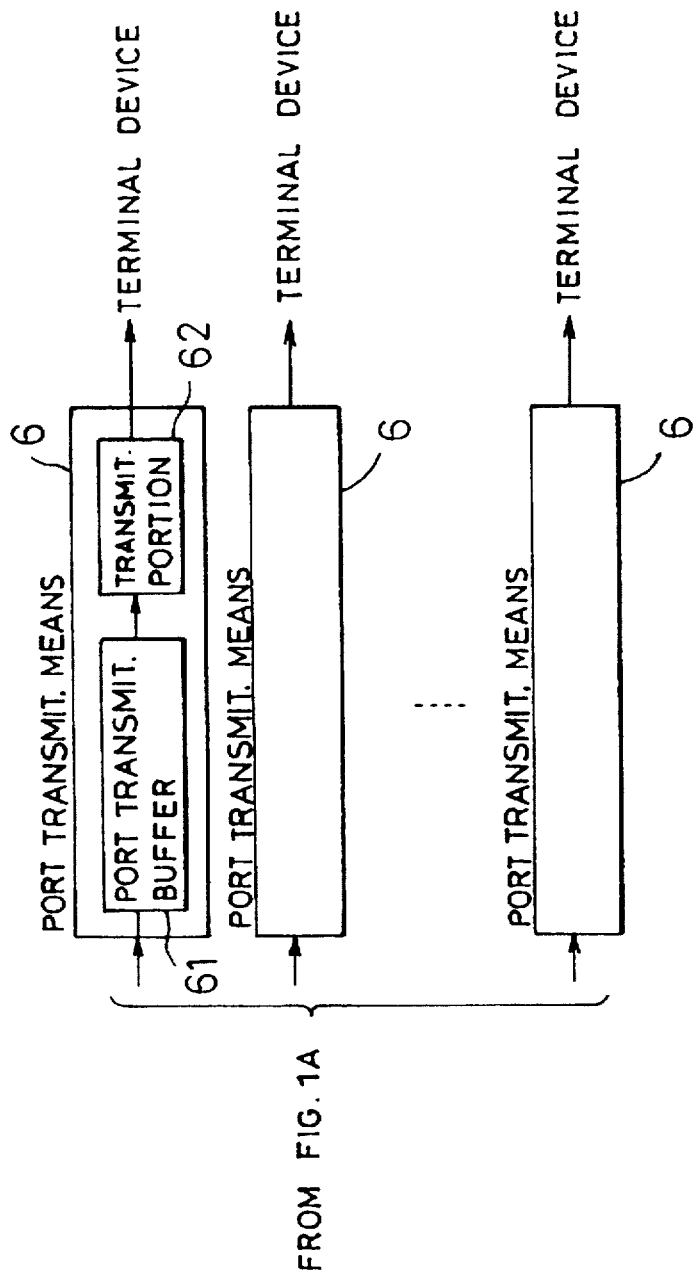

FIG. 2 (PRIOR ART)
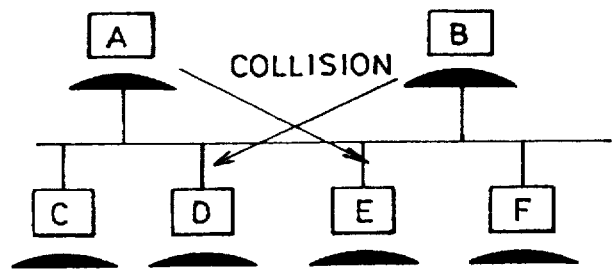
FIG. 3 (PRIOR ART)
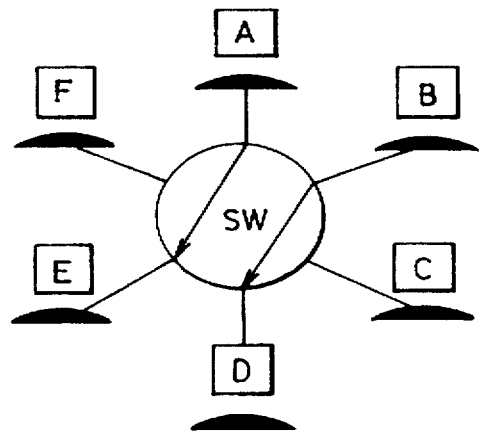
FIG. 5
| ADDRESS | PORT NUMBER |
|---|---|
| ADDRESS | PORT NUMBER |
| ADDRESS | PORT NUMBER |
| ADDRESS | PORT NUMBER |

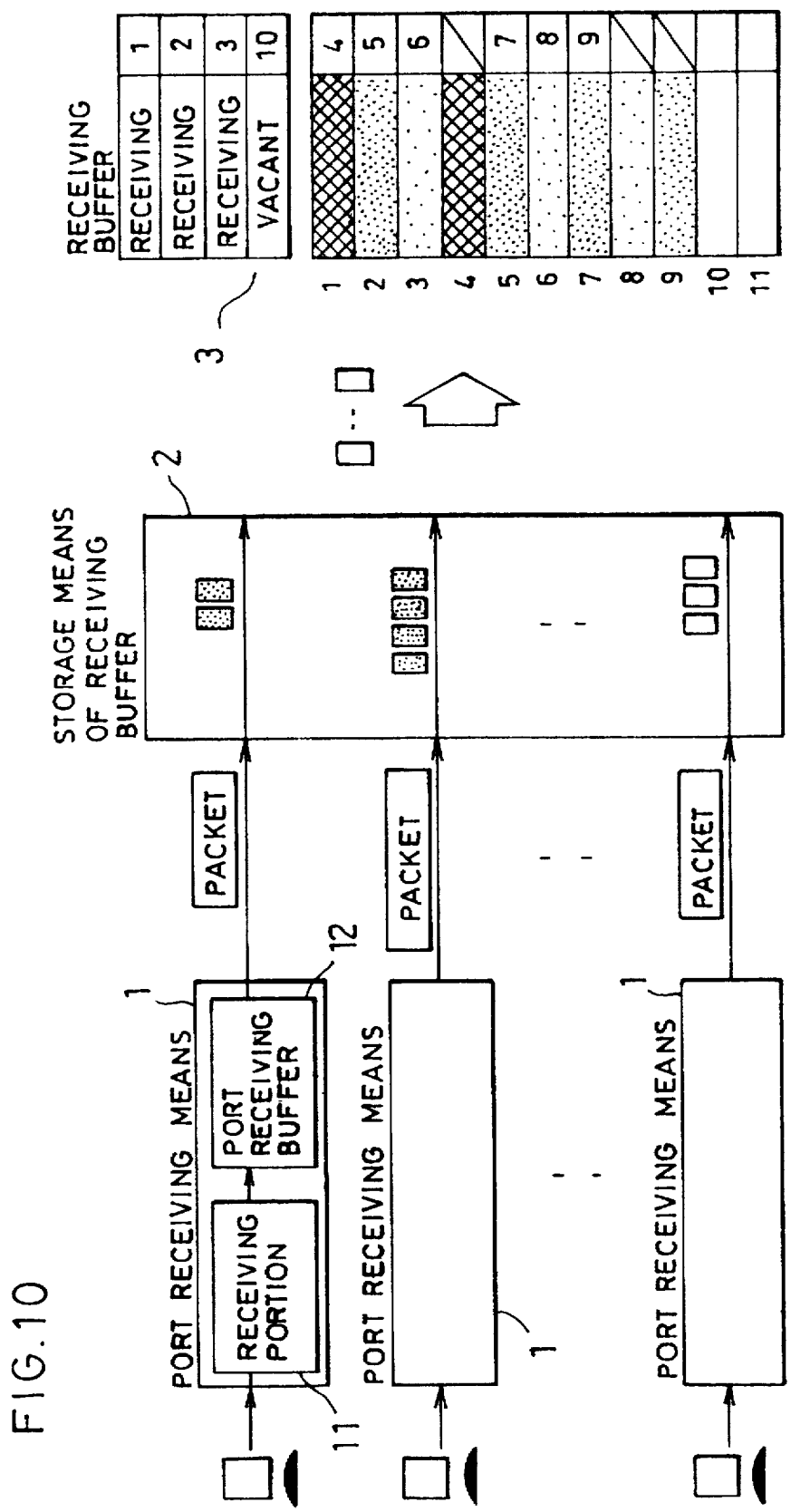

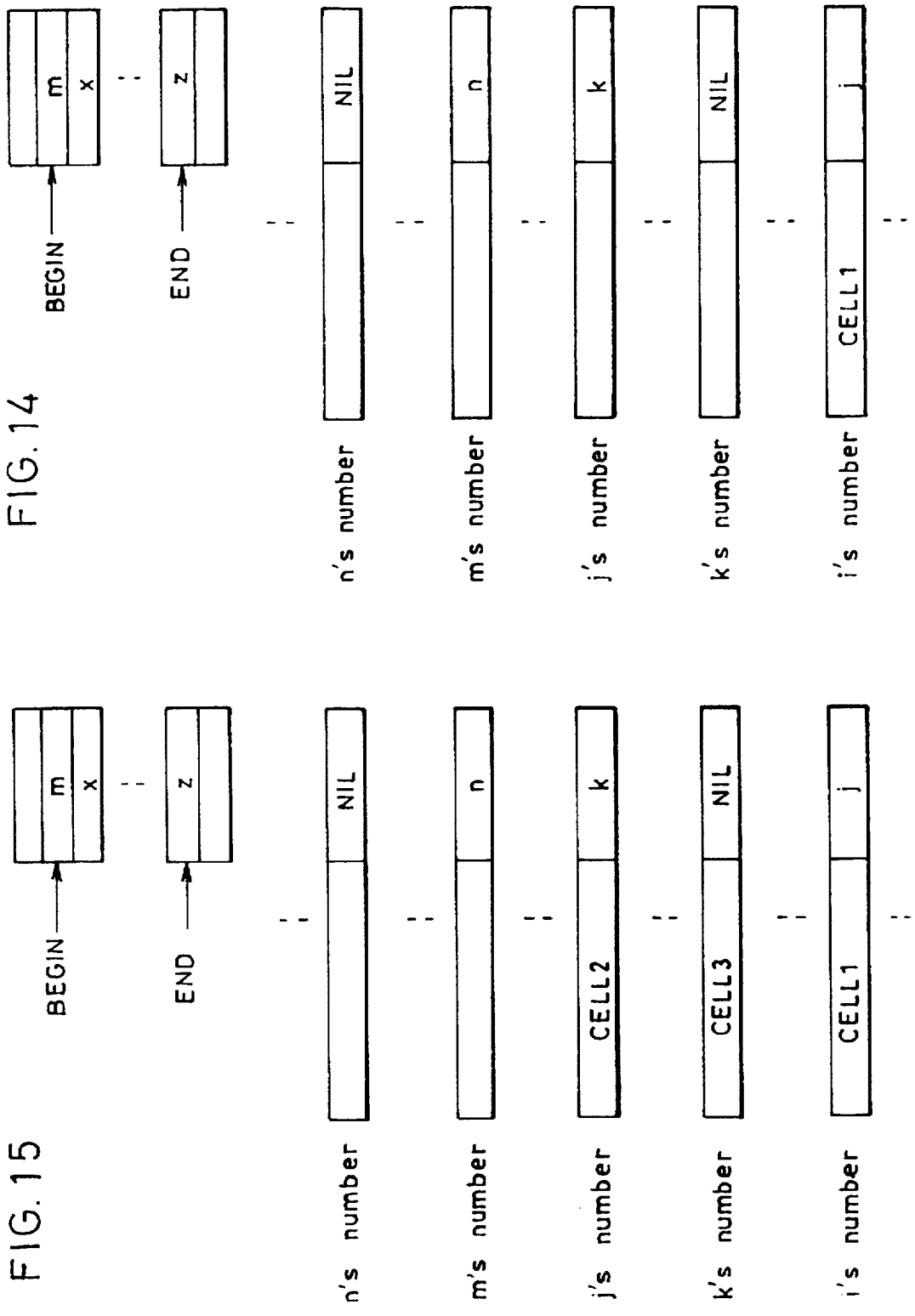

FIG. 25
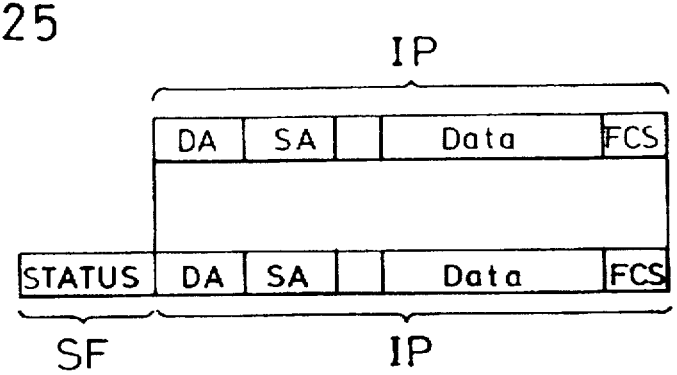
FIG. 26
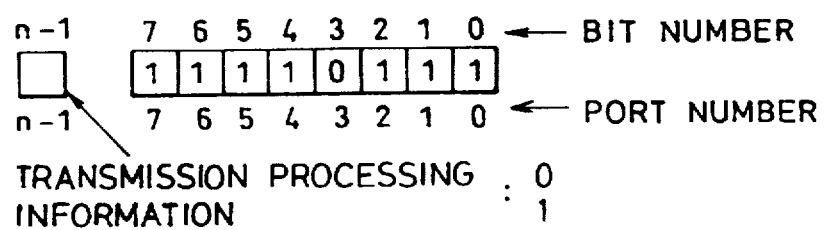
FIG. 28
PORT NUMBER = BIT NUMBER   7 6 5 4 3 2 1 0
                           |1|1|1|1|0|1|1|1|
IN CASE TRANSMIT. DESTINATION
PORT IS PORT NUMBER 3

IN CASE PORT NUMBER IS
BROADCAST AND TRANSMISS.
COMPLETED WITH PORTS
AS FOLLOWS :
  PORT 5
  PORT 0
  PORT 3
  PORT 2
  PORT 4
  PORT 7
  PORT 1

| 7 | 6 | 5 | 4 | 3 | 2 | 1 | 0 |
|---|---|---|---|---|---|---|---|
| 0 | 1 | 0 | 0 | 0 | 0 | 0 | 0 |
| 0 | 1 | 1 | 0 | 0 | 0 | 0 | 0 |
| 0 | 1 | 1 | 0 | 0 | 0 | 0 | 1 |
| 0 | 1 | 1 | 0 | 1 | 0 | 0 | 1 |
| 0 | 1 | 1 | 0 | 1 | 1 | 0 | 1 |
| 0 | 1 | 1 | 1 | 1 | 1 | 0 | 1 |
| 1 | 1 | 1 | 1 | 1 | 1 | 0 | 1 |
| 1 | 1 | 1 | 1 | 1 | 1 | 1 | 1 |

|  | 7 | 6 | 5 | 4 | 3 | 2 | 1 | 0 |
|---|---|---|---|---|---|---|---|---|
| STATUS OF PORT P0 | 1 | 1 | 1 | 1 | 0 | 1 | 1 | 1 |
| STATUS OF PORT P1 | 1 | 1 | 1 | 1 | 0 | 1 | 1 | 1 |
| STATUS OF PORT P2 | 1 | 1 | 1 | 1 | 0 | 1 | 1 | 1 |
| STATUS OF PORT P3 | 1 | 1 | 1 | 1 | 1 | 0 | 0 | 0 |

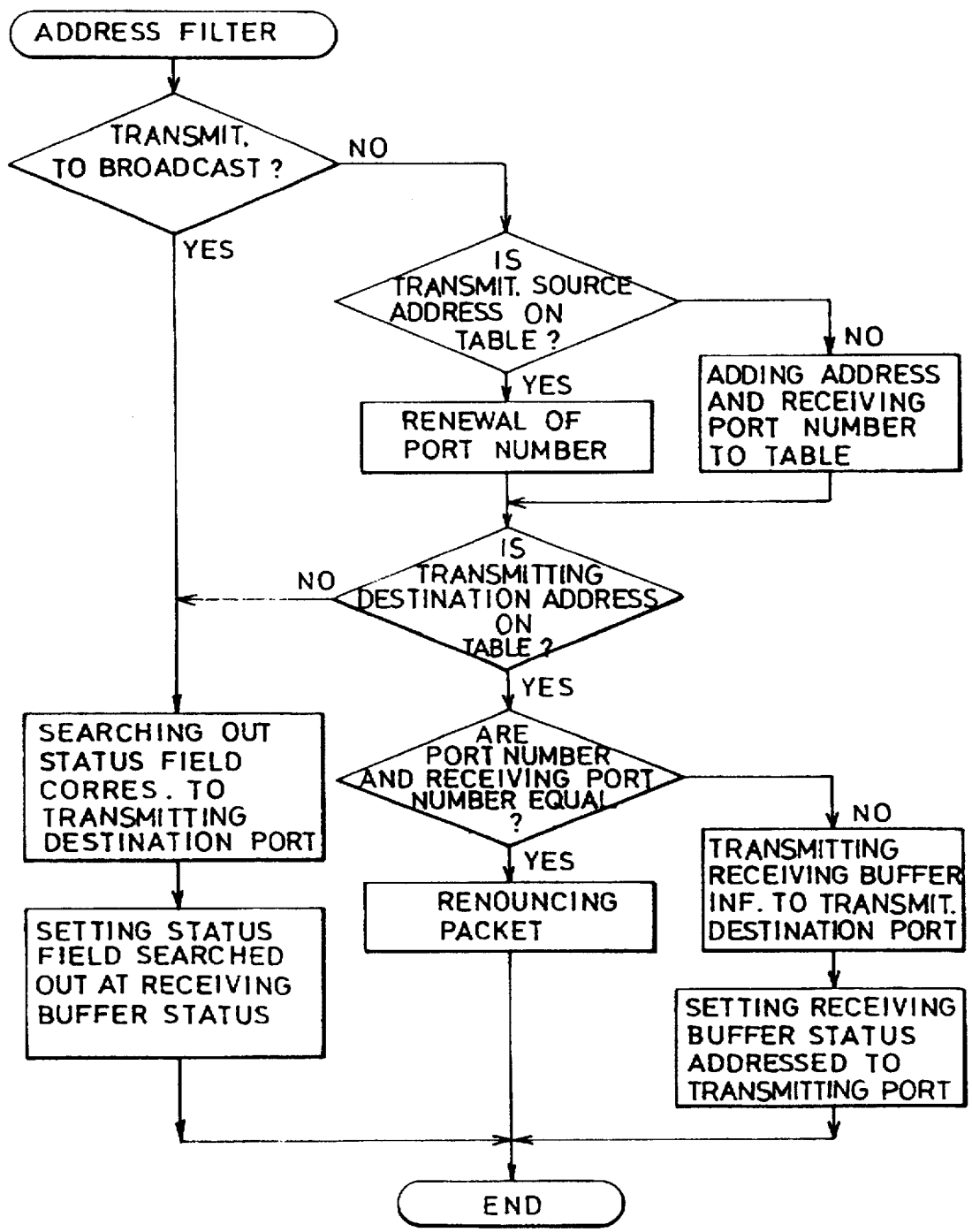

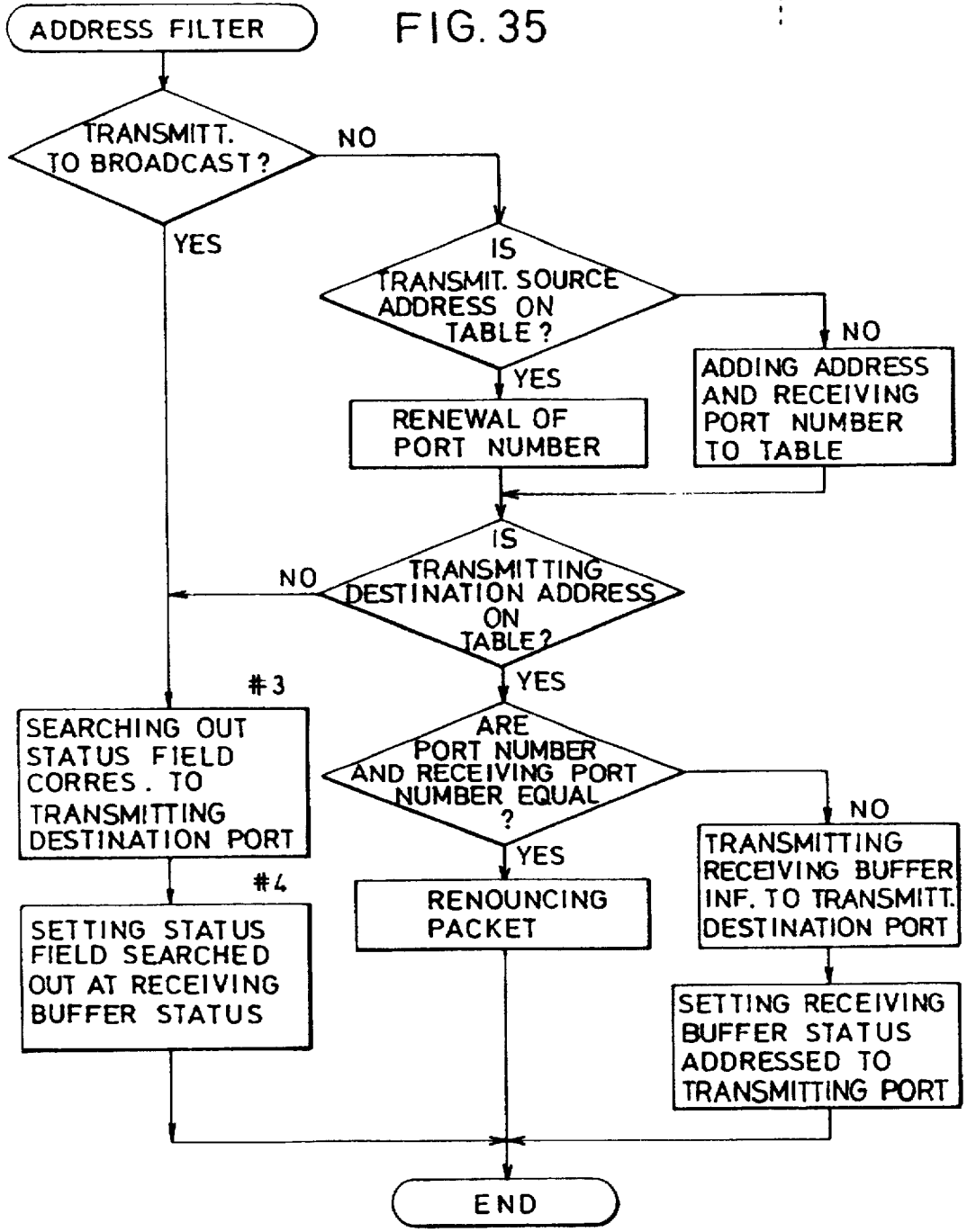

SWITCHING DEVICE FOR LAN

BACKGROUND OF THE INVENTION

This invention relates to a switching device for LAN and, more particularly, to the switching device for LAN which can be effectively utilized in communication machines and equipments, in particular, in HUB.

DESCRIPTION OF RELATED ART

A typical one of systems which have been widely employed as LAN (Local Area Network) is an ETHERNET (a registered trademark of XEROX). In the ETHERNET, there occurs a collision when simultaneous transmission takes place from a terminal A to a terminal E and from a terminal B to a terminal D, for example, as in FIG. 2, and this has been regarded as being due to a fundamental arrangement of the ETHERNET and rendering only substantially 30% of a band of 10 Mb/s to be utilizable as an influence of the collision. In order to eliminate this problem, there has been suggested a system in which a switching device SW as shown in FIG. 3 for switching packets in ETHERNET, in such manner as in a telephone exchange. According to this system, it has been possible to simultaneously execute a plurality of communications without any collision.

As a system for realizing the above switching in ETHERNET, there has been suggested in U.S. Pat. No. 5,274,631 a "Computer Network Switching System", in which, as in FIG. 4, packet processors 91–97 are provided respectively at each port of the switching device SW, for realizing a high speed switching operation with a provision in each packet processor of a receiving buffer and means for selecting to which port the communication should be transmitted. In this arrangement, the switching device SW is further provided with a multiplex logic section 98 as shown in the center of FIG. 4 as well as a system processor 99 and a network interface 100.

According to the above system, however, the provision to every port of the switching device of the receiving buffer, means for selecting to which port the transmission should be made, or the like has been necessary, so as to be troublesome in increasing manufacturing costs.

SUMMARY OF THE INVENTION

A primary object of the present invention is to provide an inexpensive switching device for LAN with an arrangement in which a receiving buffer for storing received data from all ports and an address filter for determining to which port the data should be transmitted are commonly utilized for the whole of the associated equipments.

According to a feature of the present invention, the foregoing problem is overcome by means of a switching device for LAN comprising, as shown in FIG. 1, a port receiving means 1 connected to each ETHERNET segment for receiving and buffering each packet, a storage means of receiving buffer 2 for storing the packet from a plurality of the port receiving means 1 and transmitting their stored address to an address filter means 4, a receiving buffer 3 for storing the received packet from the storage means of receiving buffer 2, the address filter means 4 reading transmitter source address and transmitting destination address of the received packet out of the receiving buffer 3 on the basis of the stored address data transmitted from the storage means of receiving buffer 2 to discriminate a transmitting destination port of the packet for transmitting the stored address and transmitting destination port of the packet to a storage means of transmitting buffer 5, the storage means of transmitting buffer 5 transferring the packet from the receiving buffer 3 to a port transmitting buffer 61 in a port transmitting means 6 of the transmitting port to which the packet from the receiving buffer 3 on the basis of the packet storing address and transmitting port data from the address filter means 4, and the port transmitting means 6 being connected to the ETHERNET segment to which the data in the port transmitting buffer 61 are to be transmitted.

According to the above arrangement of the present invention, the packet received at the port receiving means 1 is caused by the storage means of receiving buffer 2 to be stored in the receiving buffer 3. The storage means of receiving buffer 2 transfers the stored address of the packet to the address filter means 4, where the transmitter source address and transmitting destination address of the packet stored in the packet are read out of the stored address data, the transmitting destination address is searched through the address tables, and any one of the ports to which the packet should be transmitted is recognized. Further, by registering the transmitter source address and the data of the receiving port in the address table, it is possible to recognize that a terminal having which address is connected to which port. Next, the stored address of this packet and the data to which port the packet should be conveyed are transmitted. At the storage means of transmitting buffer 5, the port to which the contents of the packet are to be transmitted from the stored address are transferred to the port transmitting means 6. At this port transmitting means 6, the packet within the port transmitting buffer 61 is transmitted to the ETHERNET. Accordingly, it should be appreciated that the switching to the packet of ETHERNET is made possible by means of the foregoing operation.

For further details of the arrangement and function of the present invention, they shall be clarified in the following description detailed with reference to accompanying drawings.

BRIEF DESCRIPTION OF THE DRAWINGS

FIG. 1 consists of FIGS. 1A and 1B shows in a block diagram a basic arrangement of the switching device for LAN according to the present invention;

FIG. 2 is an explanatory view for a state of collision due to simultaneous transmission in the ETHERNET of the basic arrangement of FIG. 1;

FIG. 3 is an explanatory view for the principle of the switching device in the ETHERNET of the basic arrangement in FIG. 1;

FIG. 5 is a diagram showing an arrangement of an address table employed in the basic arrangement in FIG. 1;

FIG. 10 is a block diagram showing an arrangement of a fourth embodiment according to the present invention;

FIG. 14 is an explanatory view for a second state of the receiving buffer in the fourth embodiment of FIG. 10;

FIG. 15 is an explanatory view for a third state of the receiving buffer in the fourth embodiment of FIG. 10;

FIG. 25 is a format showing a packet in the sixth embodiment of FIG. 24;

FIG. 26 is a format showing a status field in the sixth embodiment of FIG. 24;

FIG. 28 is a format diagram showing the status field in the sixth embodiment of FIG. 24;

FIG. 33 is a flowchart showing the operation of the address filter section in the seventh embodiment of FIG. 32;

FIG. 34 is a format diagram showing a status field for explaining the operation of an eighth embodiment according to the present invention; and FIG. 35 is a flowchart showing the operation of an address filter means in the eighth embodiment of FIG. 34.

Figure 4:
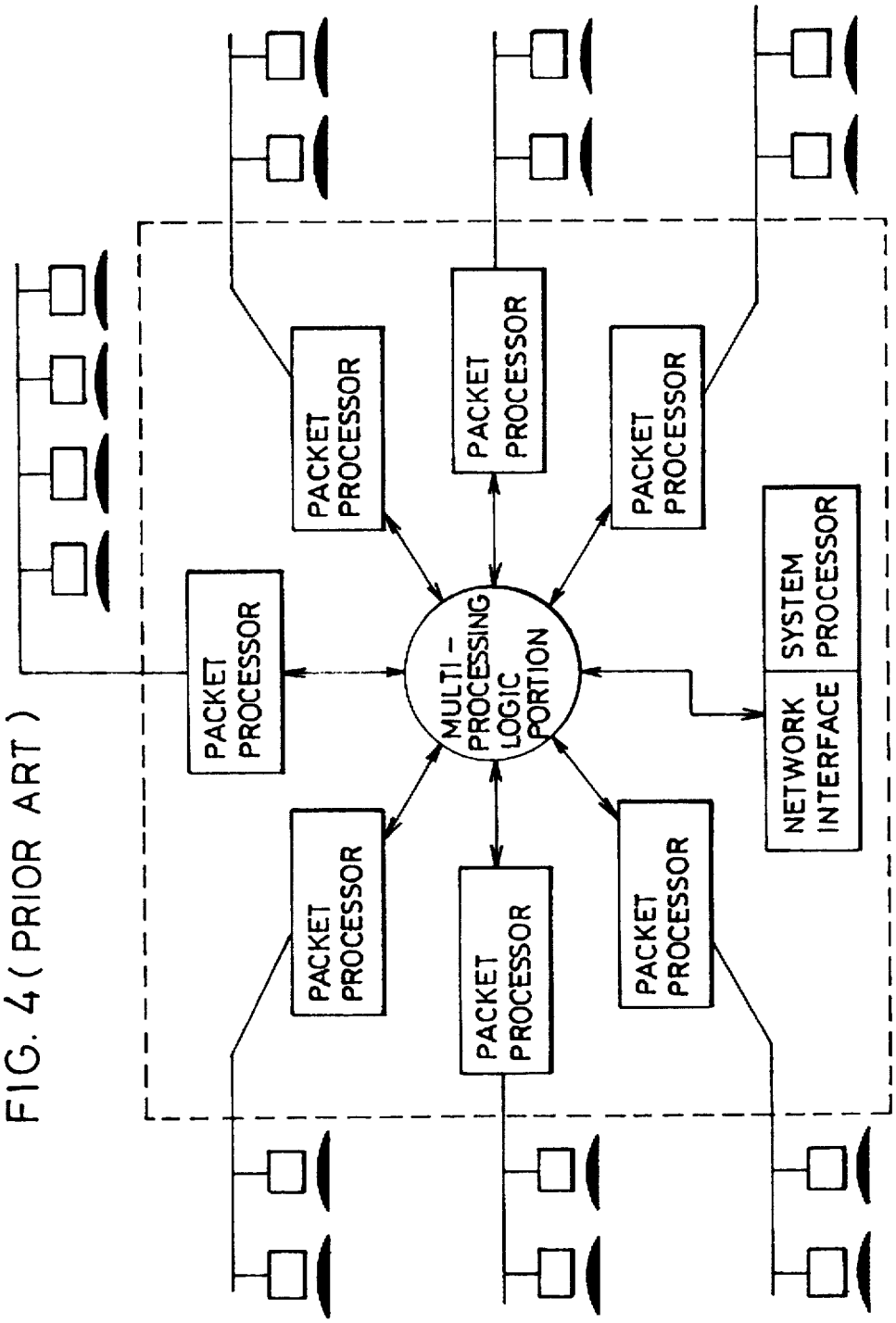
FIG. 4 is a block diagram showing a conventional switching device in the ETHERNET of the basic arrangement in FIG. 1.

While the present invention shall now be described with reference to the respective embodiments shown in the accompanying drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

In the following, further, the preferred embodiments of the present invention shall be explained with reference to the drawings. FIG. 1 shows a basic arrangement of the present invention, in which a receiving portion 11 of each port receiving means 1 comprises an interface section connected to each segment of ETHERNET. The packet provided from the receiving portion 11 is stored in a port receiving buffer 12 in the means 1, and the port receiving means 1 including these receiving portion 11 and port receiving buffer 12 is connected to each port. Separately from the port receiving buffers 12, just one receiving buffer 3 is provided for the entire switching device, and the arrangement is so made that the respective packets are all stored in this receiving buffer 3.

As the packets to the respective ports are received non-synchronously, a storage means of receiving buffer 2 is provided for playing a roll in storing the data in the receiving buffer 3 while rendering the data to be in synchronism with each other at the respective port receiving means 1 of the ports. By setting the band from the storage means of receiving buffer 2 to the receiving buffer 3 sufficiently larger than that from the respective port receiving means 1 to the storage means of receiving buffer 2, the arrangement is made possible to allow the packets to be stored in the receiving buffer 3 without any loss with a small buffer value set for the port receiving buffers 12 (required buffering rate for synchronizing the non-synchronously incoming packets with the operation of the storage means of receiving buffer 2). Rather than providing a large buffer at every port, the concentrative provision of the single, larger buffer while providing at the respective ports the smaller buffers for absorbing the asynchronism enables it possible to improve the efficiency of utilization of the buffer and, consequently, to lower the required buffer value for the entire device.

Figure 6:
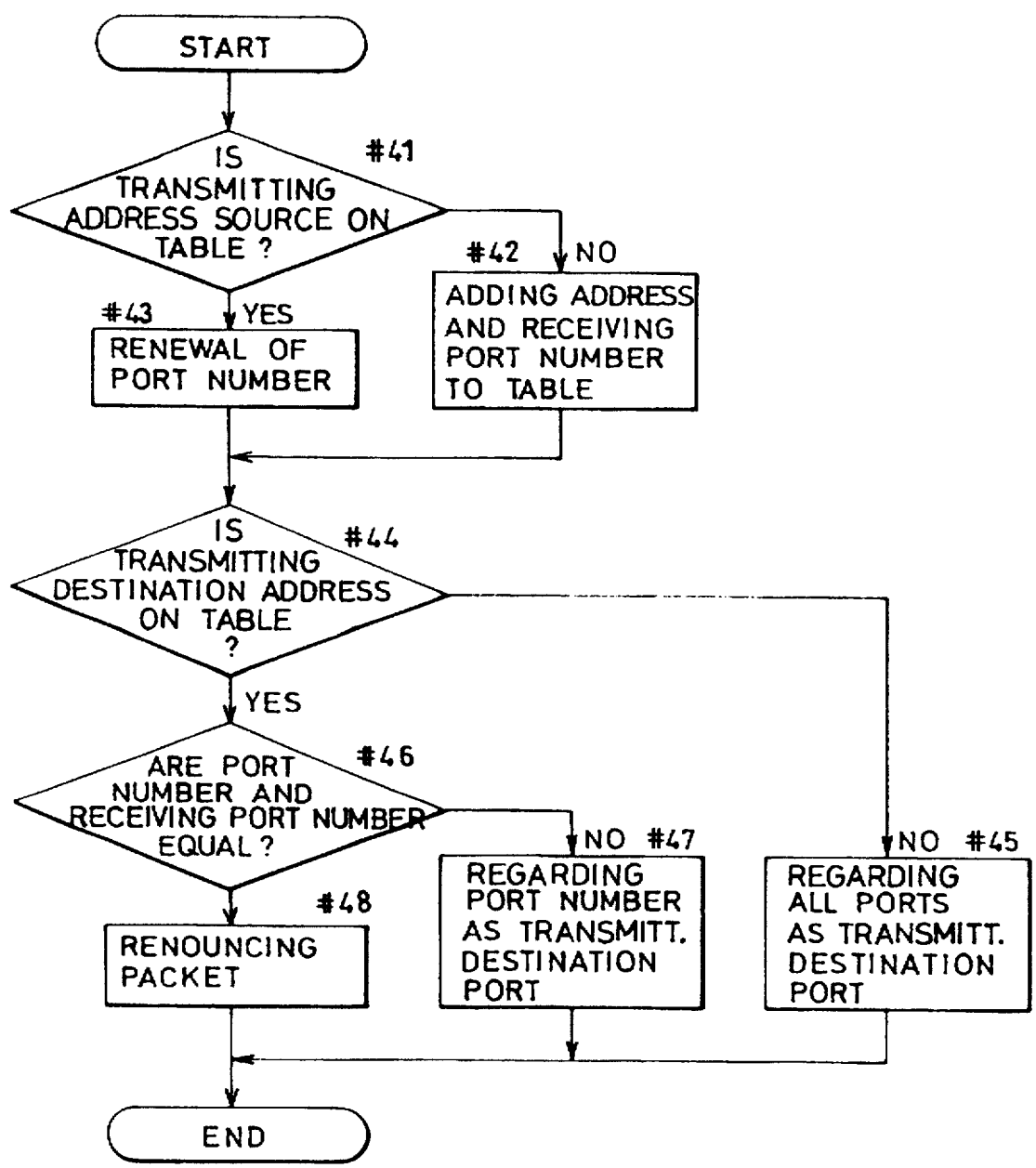
FIG. 6 is a flowchart showing a processing at the address filter means employed in the basic arrangement of FIG. 1.

By storing each packet in the receiving buffer 3, the storage means of receiving buffer 2 transmits to an address filter means 4 the stored address of the packet and the number of the receiving port to which the packet has been input. The address filter means 4 reads out of the receiving buffer 3 only a transmitter source address and transmitting destination address on the basis of the stored address. The address filter means 4 includes such a table comprising addresses and port numbers as shown in FIG. 5, and reference to this table makes it possible to recognize to which port an equipment of which address is connected. In FIG. 6, a flowchart of a main processing operation of the address filter means 4 is shown.

First, the transmitting source address or the source of transmitted address is searched for in the foregoing table (#41) and, when the search fails, it is regarded that the particular address and receiving port number are newly registered on the table (#42). When the transmitting source address is identified but its port number differs from the receiving port number registered on the table, it is regarded that the equipment has been moved and its connected port has been altered, and the received port number is re-registered at a position of identified port number (#43). Further, a processing equivalent to such address study of bridge as aging or the like is executed. Next, a search is made for the presence or absence on the table of the transmitting destination address (#44). In the absence of the transmitting destination address, none of the ports to which the packet is to be transmitted can be specified, and all ports except the receiving port are regarded as the transmitting destinations (#45). In the presence of the transmitting destination address, its port number is compared with the receiving port number (#46) so that, when they are different, the particular port number is regarded as the transmitting destination (#47). In case the port number and the receiving port number are equal, the communication is the one on the same segment and not required to be transferred to any other port, and the particular packet is erased from the receiving buffer 3 to be renounced (#48).

Except for the case where the packet is renounced at the address filter means 4, the stored address and transmitting destination port number are transferred from the address filter means 4 to a storage means of transmitting buffer 5. This storage means of transmitting buffer 5 transfers the contents of the packet from the receiving buffer 3 to a port transmitting buffer 61 in a port transmitting means 6 of the transmitting destination port. The port transmitting means 6 transmits the packet within the port transmitting buffer 61 through a transmitting portion 62 forming an interface with the ETHERNET segment.

Figure 7:
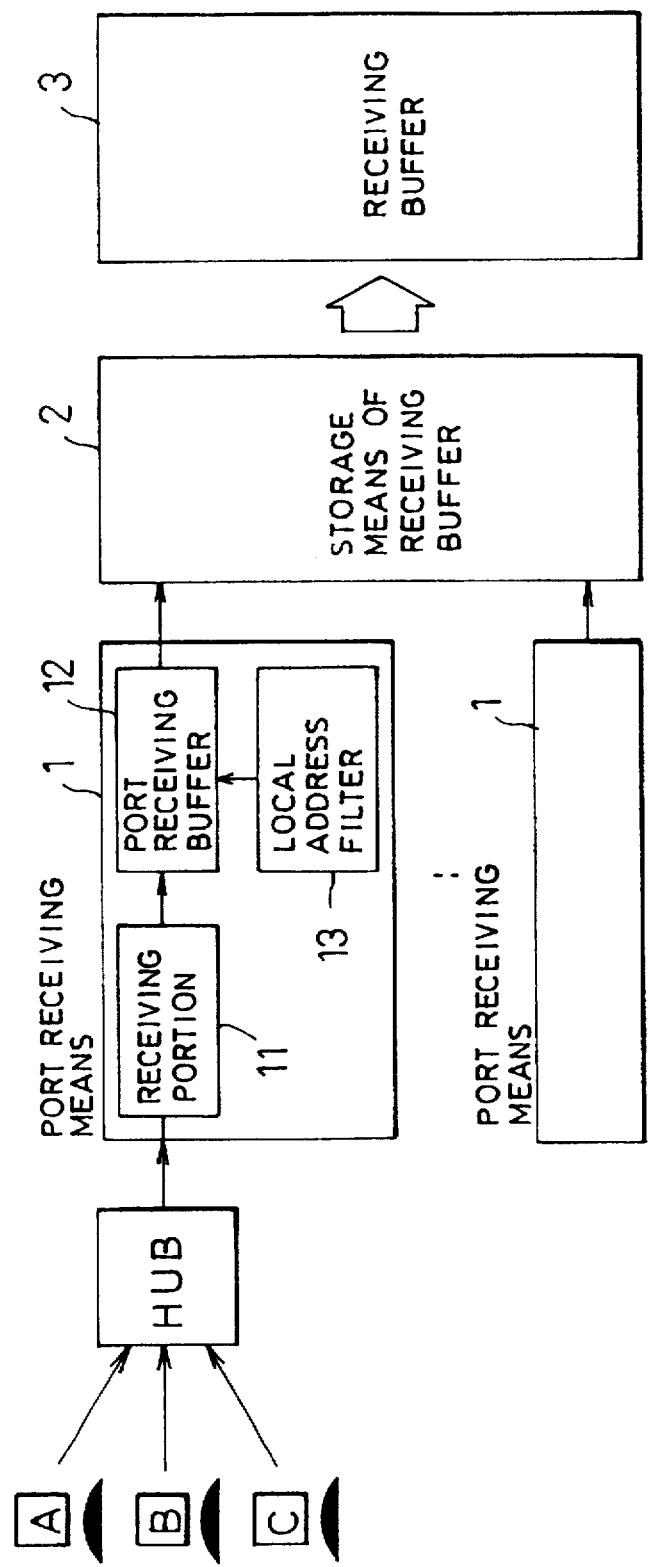
FIG. 7 is a block diagram showing an arrangement of a first embodiment according to the present invention.

Referring further to various concrete embodiments of the present invention, FIG. 7 shows in a block diagram a first embodiment of the present invention. While in the foregoing basic arrangement shown in FIG. 1 all of the received data are stored once in the receiving buffer 3, the number of packets once stored in the receiving buffer 3 but renounced at the address filter means 4 increases when many communication take place within one segment connected to the port, and the buffer value or capacity of the receiving buffer 3 or the band employed between the storage means of receiving buffer 2 and the receiving buffer 3 set as in the foregoing becomes useless, rendering the circuit efficiency as having been deteriorated.

In the first embodiment of the present invention, on the other hand, there is provided in the port receiving means 1 a local address filter 13, as shown in FIG. 7. This local address filter 13 is an address filter having only an address of a terminal connected to the particular port as the address table, so that any packet between own ports will be renounced by this local address filter. Further, this local address filter functions so as to reduce an associated load at a subsequent stage and is not required to perform any complete filtering processing. That is, the filter 13 can perform the function as it is, even when the address table is minimized. Thus, even when the address table is limited, for example, to be enough for one address, the very first packet of such a sequential transmission between the same terminals as in a file transmission cannot be renounced, but subsequent, sequential packets can be renounced, and the function of attempting the reduction of the load at the subsequent stage. Accordingly, it is possible to reduce the capacity of the receiving buffer 3 by the use of the inexpensive local address filter 13, and also to improve the circuit efficiency in respect of the band between the storage means of receiving buffer 2 and the receiving buffer 3.

Figure 8:
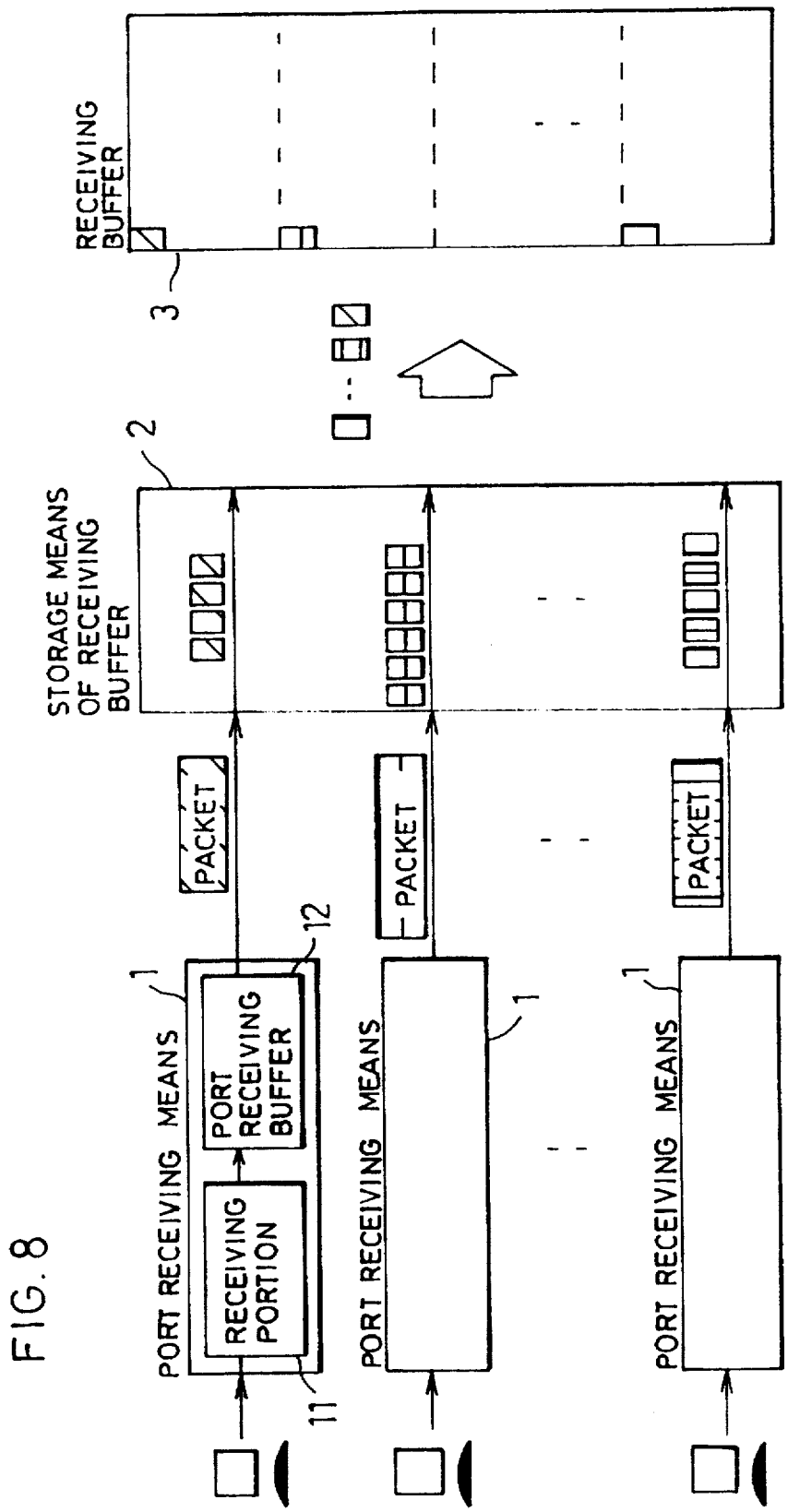
FIG. 8 is a block diagram showing an arrangement of a second embodiment according to the present invention.

In a second embodiment of the present invention as shown in FIG. 8, a feature resides in that the receiving buffer 3 is held in common in the device, and the arrangement of the receiving buffer 3 becomes important for having this feature fully shown. In the present embodiment, the packet is stored as divided into cells of a certain fixed length as in FIG. 8, in order to minimize the capacity of the port receiving buffer 12. There are provided in this port receiving buffer 12 a buffer enough for two cells. When the data for one cell are stored, the storage means of receiving buffer 2 sends the cells to the receiving buffer 3. With this arrangement, the transmission of the cells is started even when all of the packet data have not been received as yet, and the length of the packet is not made known yet. However, the transfer is made possible even when the packet length is not made known preliminarily, provided that the receiving buffer 3 is divided into blocks for each of the largest packet length and the packet is stored in the unit of such block. With this arrangement, the port receiving buffer 12 for each port can be minimized, and the transfer of the packet may be started even during the receiving of the packet, so that there arises an advantage that any delay in the processing can be minimized. On the other hand, the division of the receiving buffer 3 into the blocks with the largest packet length causes a problem to arise in that the efficiency of use of the receiving buffer 3 is considered to be deteriorated.

Figure 9:
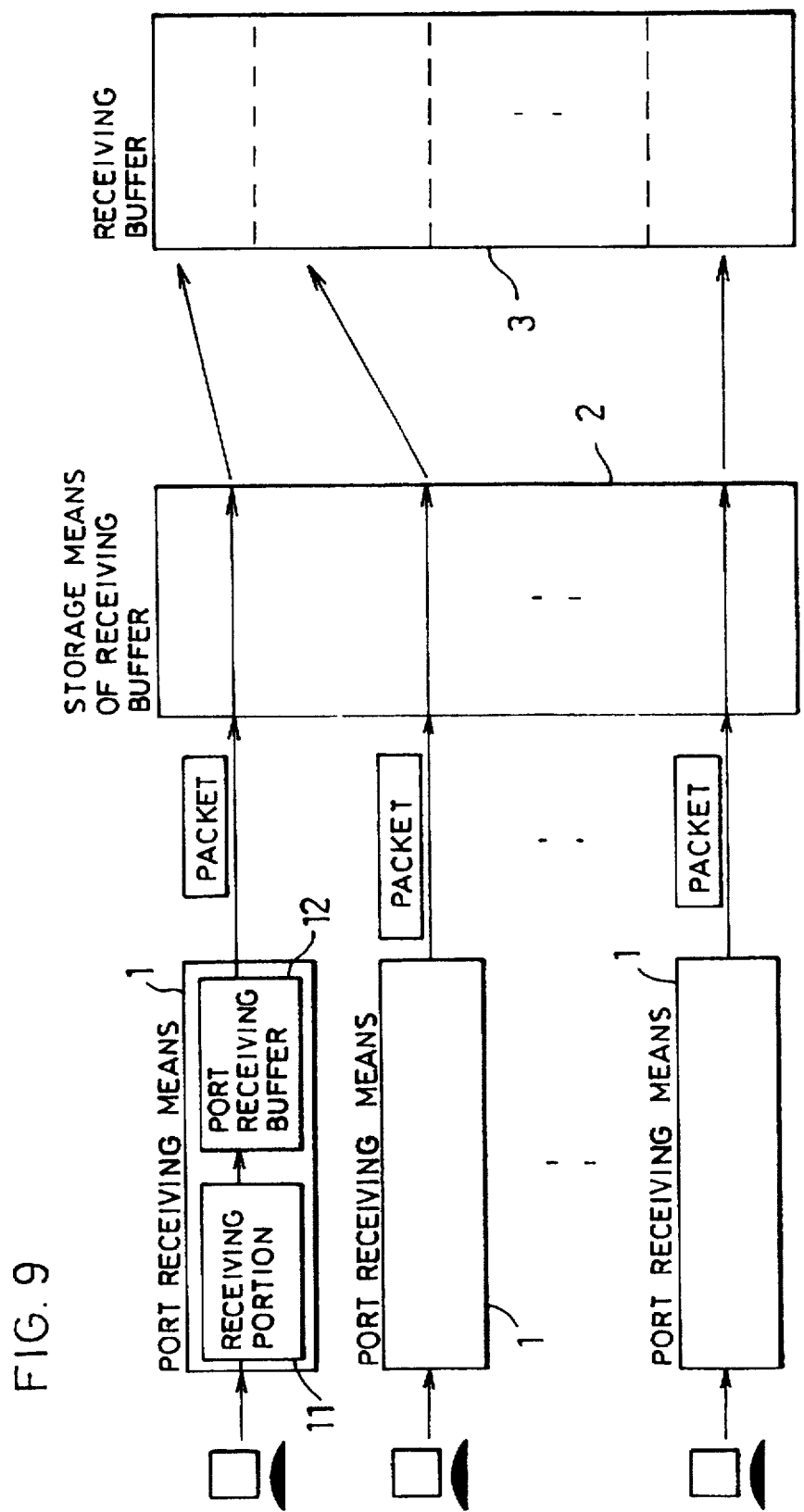
FIG. 9 is a block diagram showing an arrangement of a third embodiment according to the present invention.

FIG. 9 shows in a block diagram an arrangement of a third embodiment of the present invention, in which the efficiency of use of the receiving buffer 3 is improved by rendering the port receiving buffer 12 sufficient for receiving 2 packets of the largest packet length. At the time when the whole of one packet is received, the storage means of receiving buffer 2 secures a space of the receiving buffer 3 just for this one whole packet as in FIG. 9 and transfers thereto the packet. With this arrangement, there arises an advantage that the efficiency of use of the receiving buffer 3 is improved, but the port receiving buffer 12 for every port is enlarged and the transfer cannot be started until completion of the receipt of the whole packet, so that there is a problem in that a delay in the processing becomes remarkable.

Therefore, an arrangement capable of increasing the efficiency of use of the receiving buffer 3 while employing the cell transfer is provided by a fourth embodiment shown in FIG. 10, in which the receiving buffer 3 is sectioned in the unit of cells, and the respective cells are prepared as a list structure. For example, the packet received at the first port is stored at 1st and 4th addresses, the packet received at a second port is stored at 2nd, 5th, 7th and 9th addresses, and the packet received at the third port is stored at 3rd, 6th and 8th addresses. By realizing the receiving buffer 3 with such list structure, the storage in the unit of cells is made possible, and the efficiency of use of the receiving buffer 3 can be effectively improved.

Figure 11A:
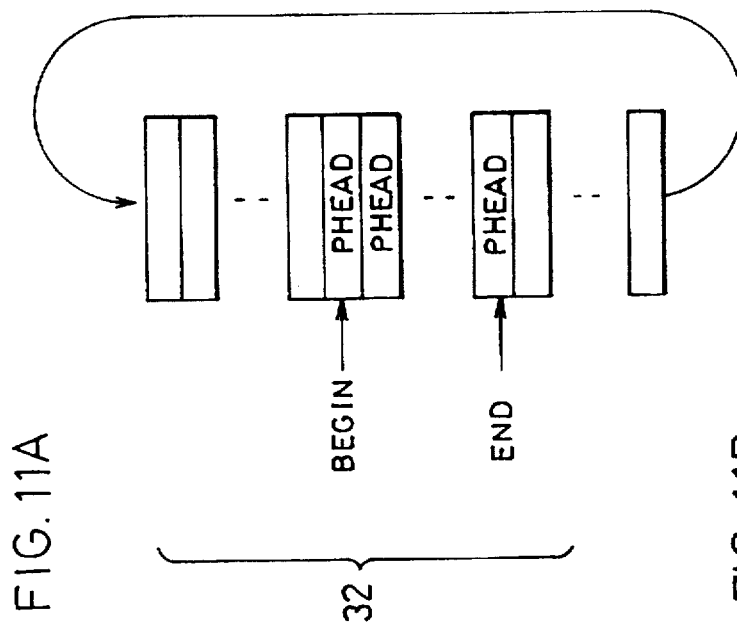
FIGS. 11A and 11B are diagrams showing an arrangement of a receiving buffer in the fourth embodiment of FIG. 10 according to the present invention.
Figure 11B:
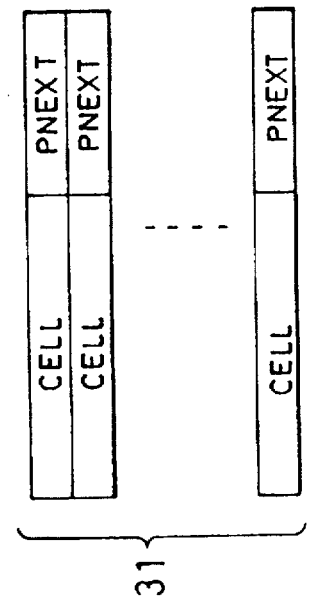

A detailed structure of the receiving buffer 3 in the present embodiment is shown in FIG. 11, in which a cell buffer 31 comprises CELL sections for storing contents of a practical packet divided into cells, and PNEXT sections for storing pointers to a next cell. A pointer to a vacant cell buffer 31 is stored in a pointer table 32 which is formed in a ring buffer structure, in which a table from a starting position BEGIN to a terminating position END is effective. PHEAD cells in the pointer table 32 denote the head of vacant cells.

Figure 13:
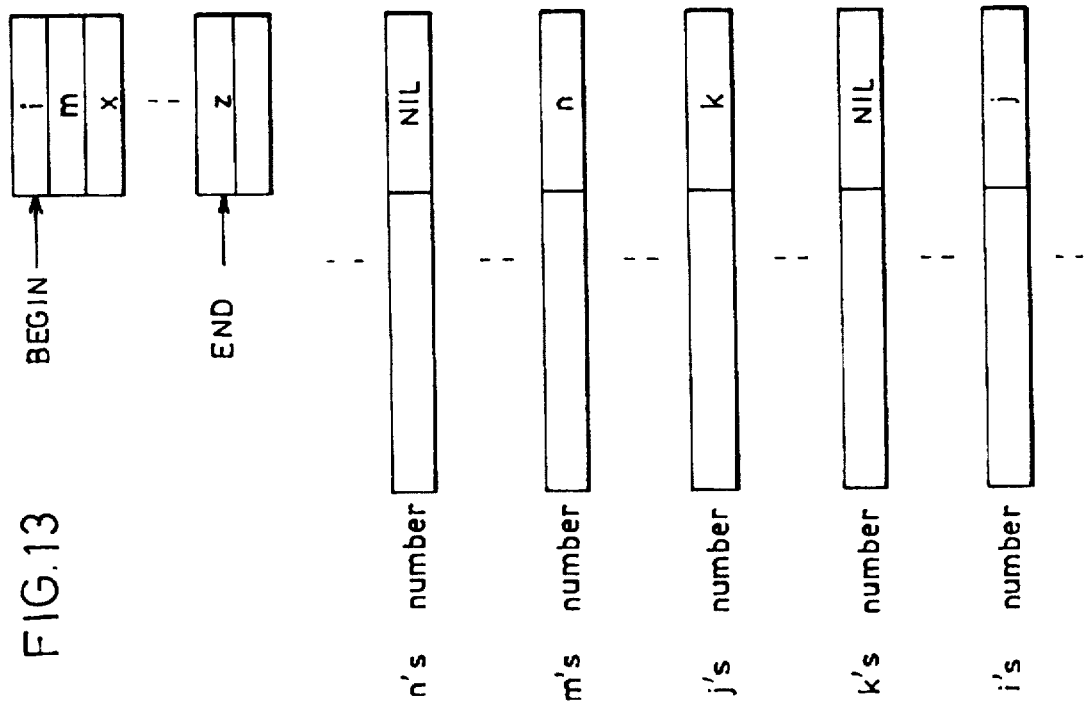
FIG. 13 is an explanatory view showing an initial state of the receiving buffer in the fourth embodiment of FIG. 10.
Figure 12:
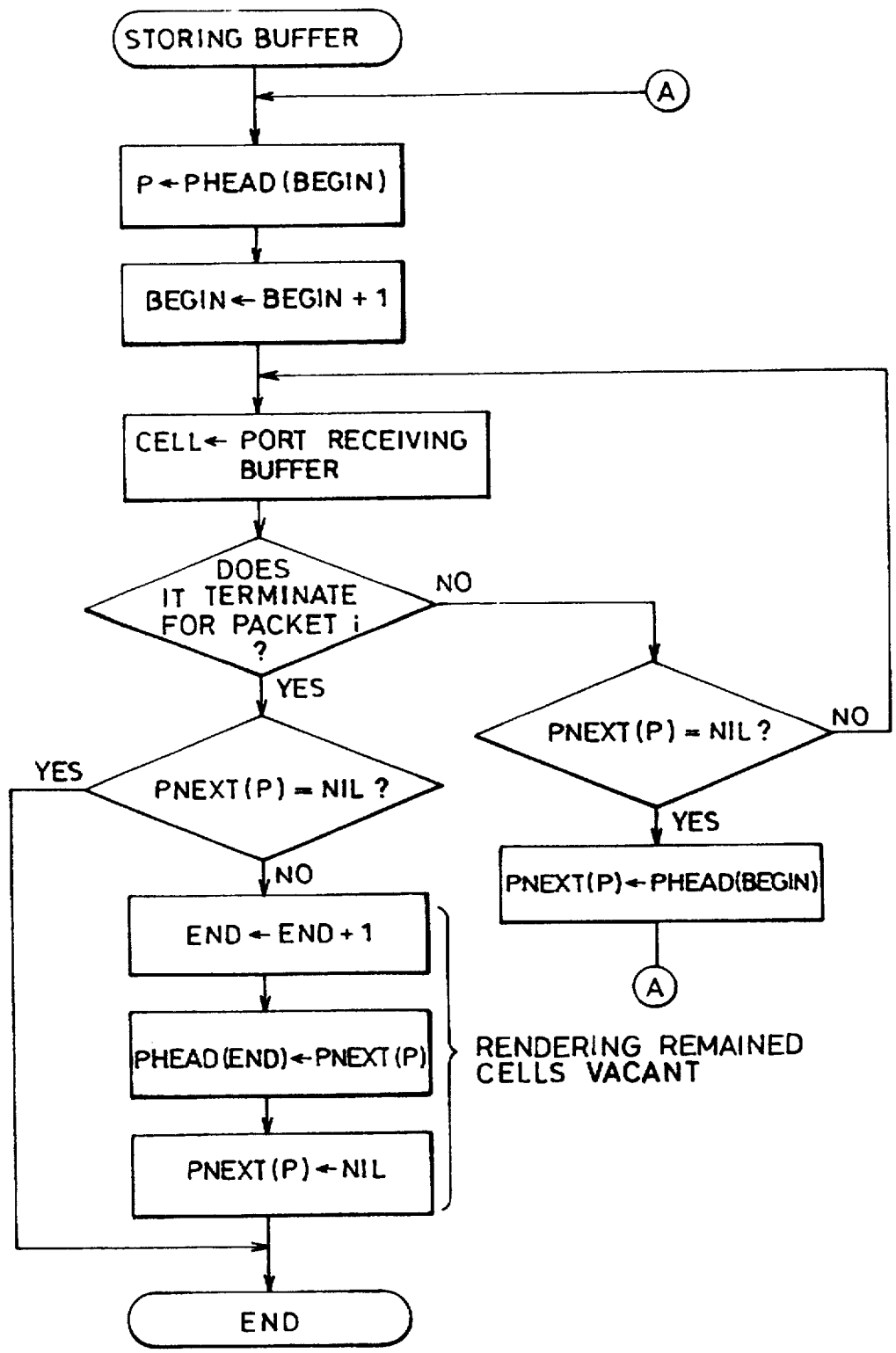
FIG. 12 is a flowchart showing a storage processing at the receiving buffer in the fourth embodiment of FIG. 10.
Figure 16:
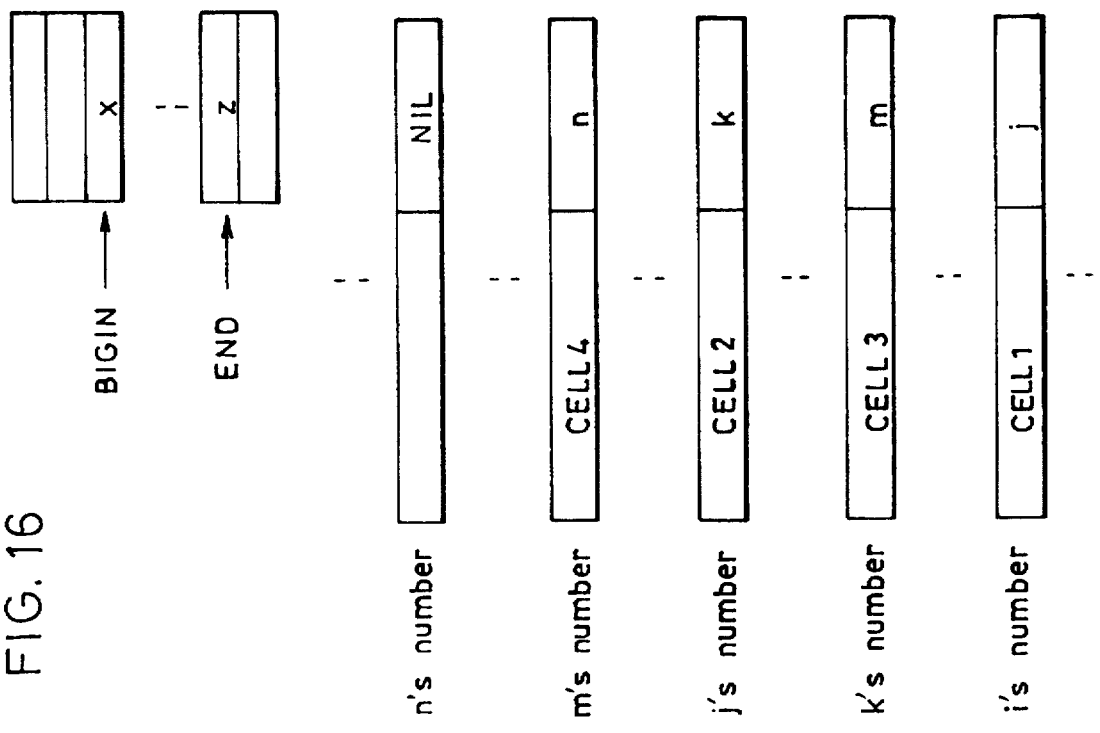
FIG. 16 is an explanatory view for a fourth state of the receiving buffer in the fourth embodiment of FIG. 10.
Figure 17:
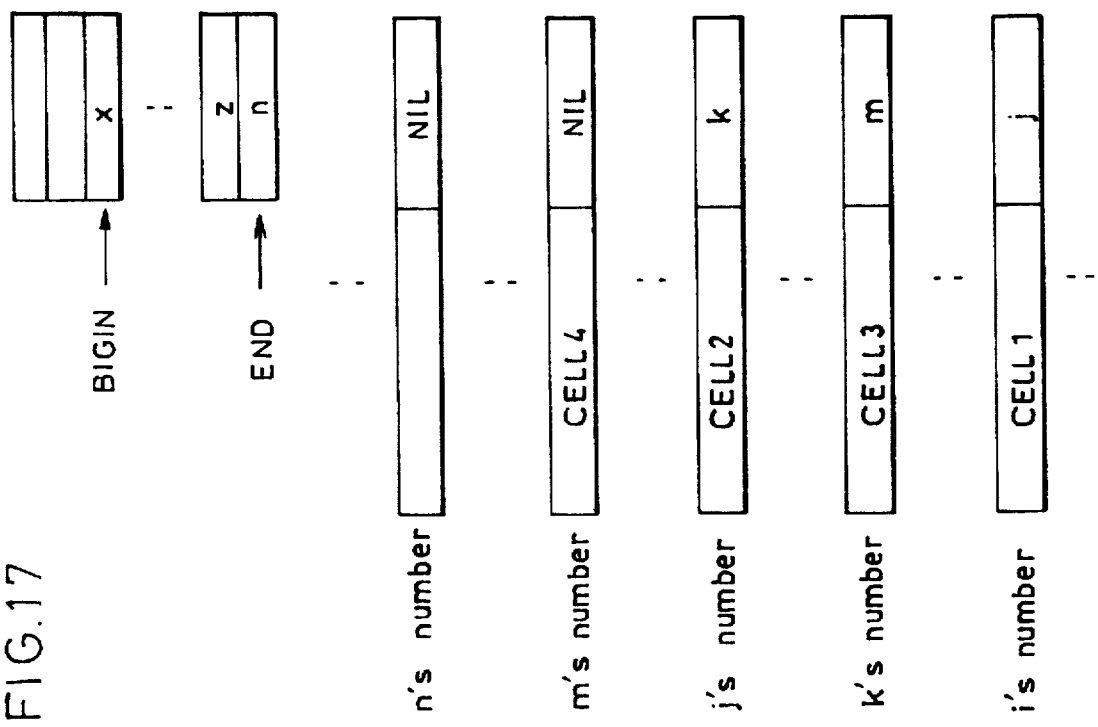
FIG. 17 is an explanatory view for a fifth state of the receiving buffer in the fourth embodiment of FIG. 10.

In FIG. 12, a processing by means of the storage means of receiving buffer 2 is shown, in which means the packet is stored sequentially as divided into the cells from the port receiving buffer 12 to the receiving buffer 3. The initial state of the receiving buffer 3 until the packet is stored is assumed to be as in FIG. 13. First, the head address "i" of vacant cell buffer 31 is read out of the pointer table 32, one of the starting positions BEGIN in the table is incremented, and one cell component is transferred from the port receiving buffer 12 to the CELL section of the i's number read out of the table. The receiving buffer 3 after the transfer of the one cell component is in such state as in FIG. 14, and a CELL 1 is transferred to the CELL section at the i's number. As a PNEXT section following the i's number CELL section has a next cell address "j", a one cell component is transferred again from the port receiving buffer 12 to the j's number CELL section, whereby a CELL 2 is transferred to the j's number CELL section as in FIG. 15. As the PNEXT section following the j's number CELL section has a next cell address "k", a one cell component is transferred again from the port receiving buffer 12 to the k's number CELL section, whereby a CELL 3 is transferred to the k's number CELL section, as in FIG. 15. A PNEXT section following this k's number CELL section has no next cell address. This state is represented in FIG. 15 as "NIL". As a content of an intermediate PNEXT section is made NIL, it is meant that there is no list of cells, so that a new PHEAD is read out of the pointer table 32, and a remaining part is further transferred with the PNEXT section connected again. As in the arrangement of FIG. 15 an m's number is written in a PHEAD section of the starting position BEGIN of the pointer table 32, the list is newly added from the m's number. This aspect with the list added is shown in FIG. 16. When the PNEXT section is NIL upon completion of the transfer of the cells for one packet component, it is meant that the list of cells has been just fully used. When a next list still remains, on the other hand, it is required to render the remaining part to be employable as a vacant cell. In this case, as in FIG. 17, a remaining part (as PNEXT section following m's number CELL section indicates n's number, the remaining part is part following this m's number) is added to the pointer table 32, and the terminating position END of the pointer table 32 is incremented by one. To render the receiving buffer 3 to be vacant after the transfer to the port transmitting buffer 61, the head address of this cell may only be registered in the pointer table 32.

While in the foregoing arrangement the treatment of the list structure is complicated and an excessive memory for storing the address of next cell is required, it is not necessary to preliminarily know the packet length, and the receiving buffer 3 can be used efficiently with a waste of only one cell component of the memory for one packet at the most.

Figure 18:
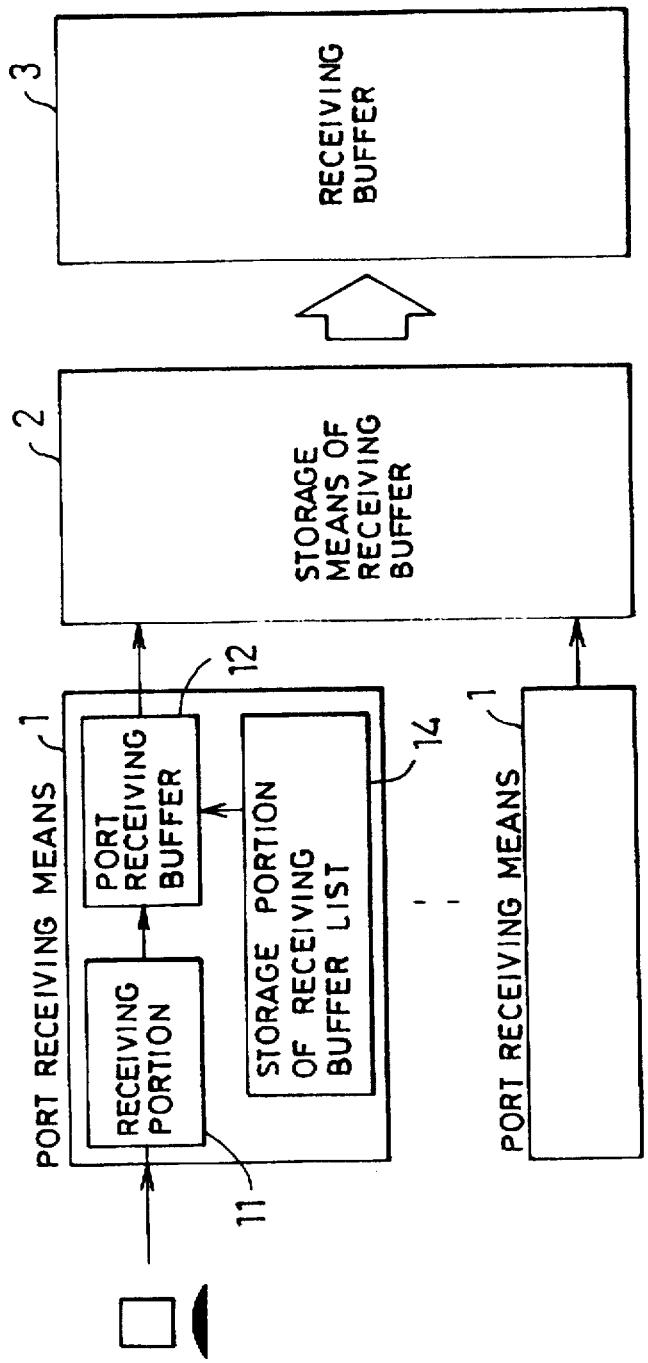
FIG. 18 is a block diagram showing an arrangement of a fifth embodiment according to the present invention.
Figure 19:
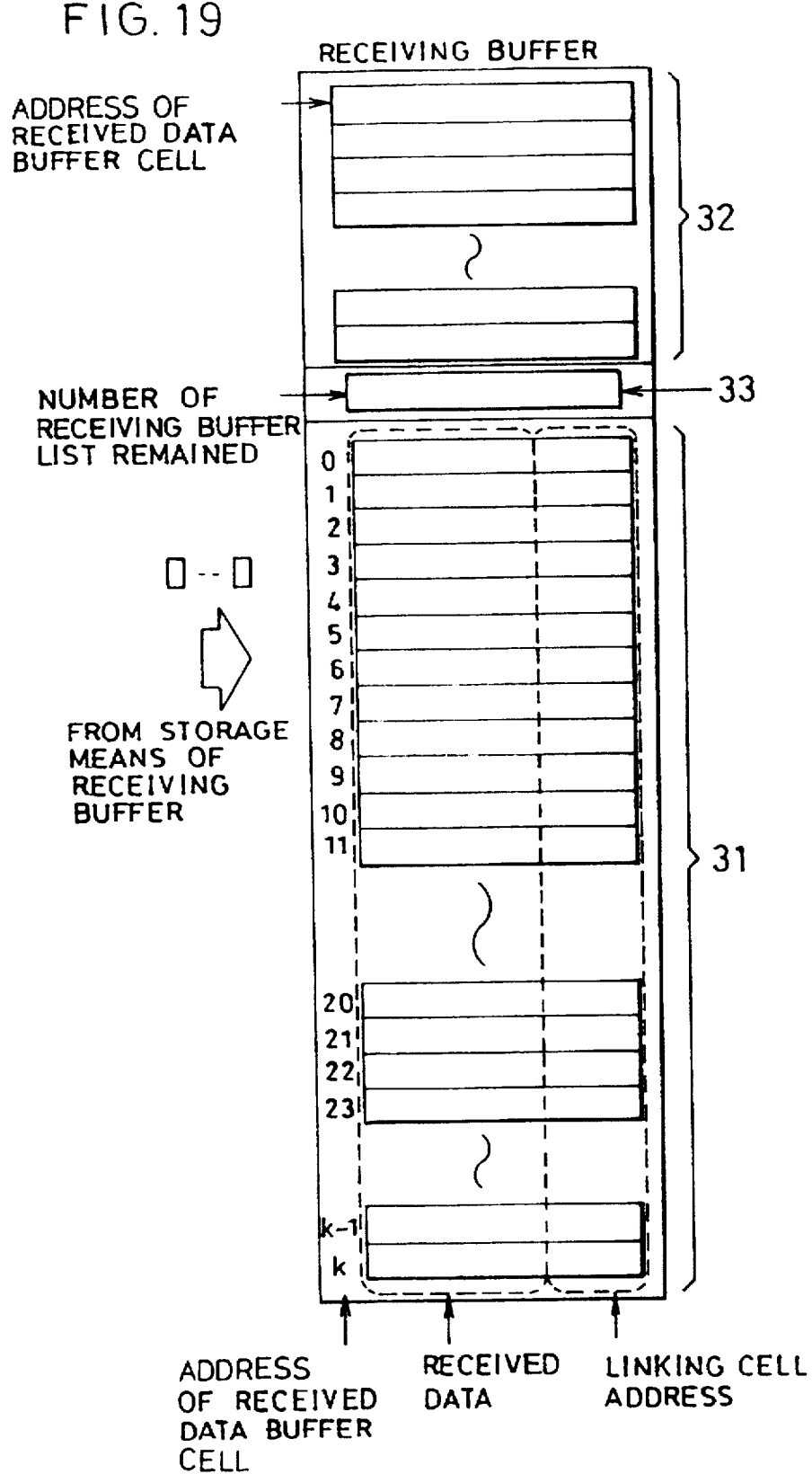
FIG. 19 is an explanatory view showing an arrangement of the receiving buffer in the fifth embodiment of FIG. 18.

In the foregoing arrangement, the cell address is acquired sequentially from the storage means of receiving buffer 2 and receiving buffer 3 upon every receipt of the packet at the respective port receiving means 1 or in an event when the one whole packet cannot be stored in the buffer of list structure. Due to this, a required time for writing is prolonged, and the time required for the data transfer is shortened. Here, as shown in FIG. 18, the respective port receiving means 1 are provided with a storage portion of receiving buffer list 14 for storing a plurality of addresses of receiving buffer cells of the receiving buffer. In this case, the arrangement of the receiving buffer 3 will be as shown in FIG. 19, in which the buffer includes, in addition to the foregoing cell buffer 31 and pointer table 32, a count data section 33 for receiving buffer list reminder. The cell buffer 31 is constituted by a CELL section for storing the received data of practically divided packet into the cells, and a PNEXT section for storing a pointer for a next cell (linking cell address), and both sections are provided with such addresses of the received data buffer cell as 0, 1, 2, . . . k−1 and k. In this pointer table 32, an address of a received data buffer cell denoting a head pointer PHEAD of the received data in the form of cells is stored. In the count data section 33, the receiving buffer list remainder denoting the vacancy of the pointer table 32 is stored.

Figure 20:
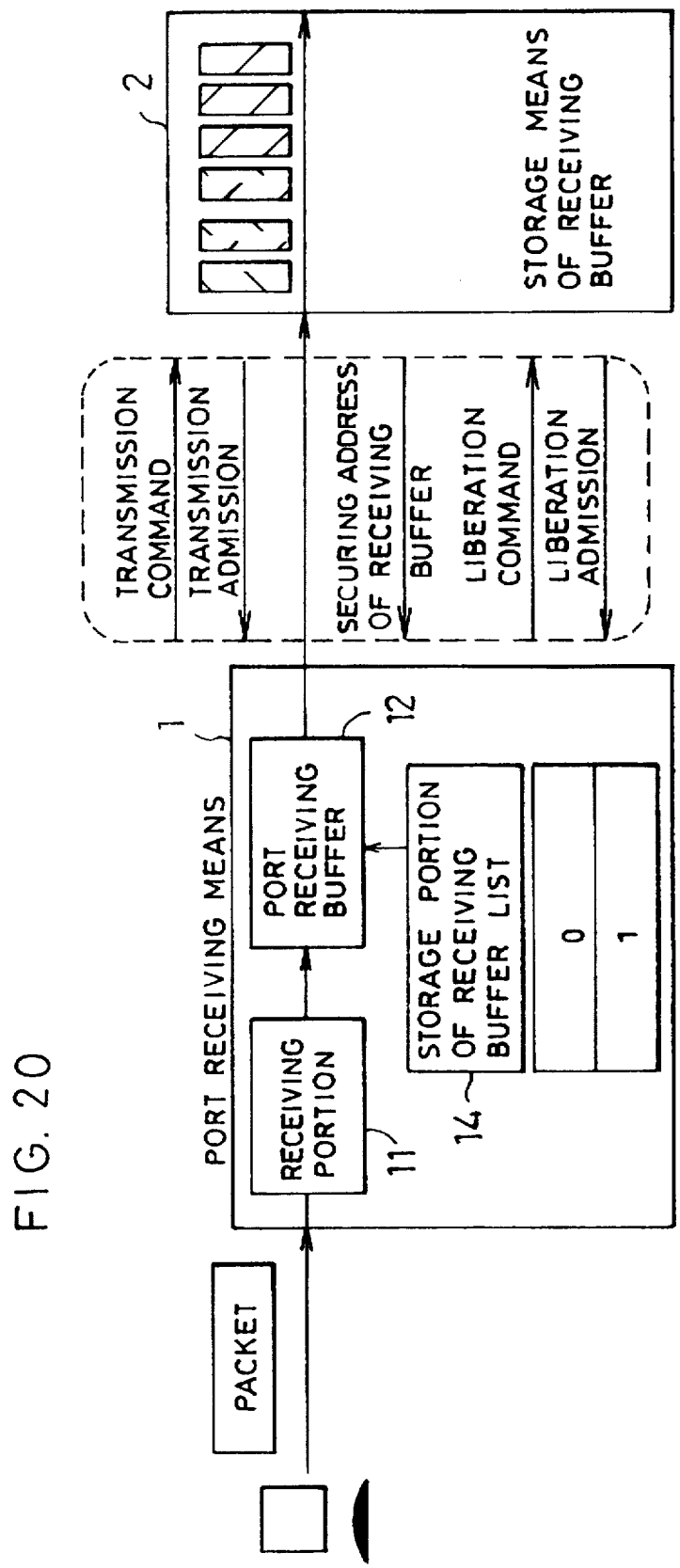
FIG. 20 is an explanatory view for a state of communication between a port receiving means and the storage means of receiving buffer in the fifth embodiment of FIG. 18.

Next, an aspect of the communication between the port receiving means 1 and the storage means of receiving buffer 2 is shown in FIG. 20. At the port receiving means 1, it is investigated whether a certain fixed number of addresses of the received buffer address is stored in the storage portion of receiving buffer list 14. In an event when the address number is less than that fixed, a demand for acquiring an address is given to the storage means of receiving buffer 2, upon which the storage means of receiving buffer 2 provides to the port receiving means 1 an admission. The port receiving means 1 obtains from the receiving buffer 3 the received buffer list remainder, and confirms whether or not the received buffer address remains. If the received buffer list remains, the received buffer address is read out of the received buffer address list formed in the pointer table 32 and is stored in the storage portion of receiving buffer list 14 in the port receiving means 1. A number deducted and read out from the receiving buffer list remainder is returned to the receiving buffer 3. In an event where the packet is received at the port receiving means 1, the data made into the cells are transferred to the receiving buffer 3 on the basis of the received data buffer address written preliminarily in the storage portion of receiving buffer list 14 with the packet made into the cells.

Figure 21:
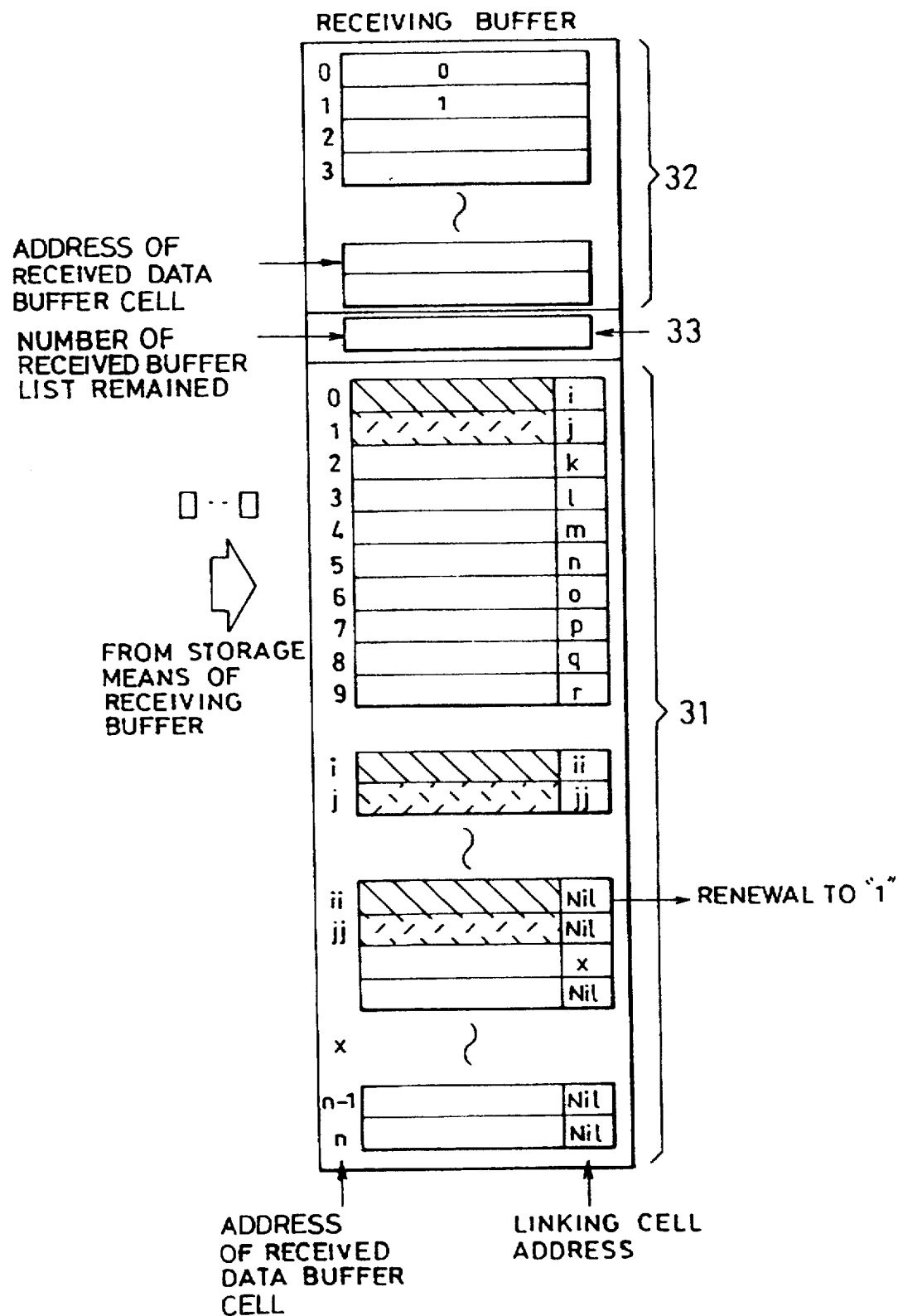
FIG. 21 is an explanatory view for the processing of storage to the receiving buffer in the fifth embodiment of FIG. 18.

The cell buffer 31 forming the receiving data buffer in the present embodiment has such list structure of the cells as has been described, in which any packet received but unable to be stored in one list is stored in a next list connected. At the time when the list has no more space, the storage portion of receiving buffer list 14 provided preliminarily with a fixed receiving data cell address causes further storage in the next buffer list to be started. A practical procedure therefor is shown in FIG. 21 in addition to FIG. 20. The storage portion of receiving buffer list 14 of the port receiving means 1 indicates the receiving data buffer cell address in the cell buffer 31. The receiving buffer list remainder is made to be an offset value of the pointer table 32. Since the storage portion of receiving buffer list 14 of the port receiving means 1 is vacant initially, the receiving buffer list remainder is read out of the storage means of receiving buffer 2, an d the presence or absence of the cell address in the pointer table 32 is descriminated. In the presence of the cell address, two addresses 0, 1 are written in the storage portion of receiving buffer list 14. The receiving buffer list remainder is added by "2" and is rewritten to a value denoting a position of a next address list.

When a packet made into cells, for example, in a size of six cells is received next, the port receiving means 1 writes the data made into cells in the address of received data buffer cell from the storage portion of receiving buffer list 14. As an address initially appointed is "0", the received data in the form of cells are written in a CELL section starting from the address "0", and a linking cell address (PNEXT section) is read. Next, as a next stage address "i" is appointed, the received data in the form of cells are written in a CELL section starting from the address "i", and a linking cell address (PNEXT section) is read. Next, as it is recorded that no sequential link address is present (NIL) this time, an address of received data buffer cell (=1) is read out of the storage portion of receiving buffer list 14, a linking cell address (PNEXT section) following a CELL section of an address "ii" in the received data buffer is rewritten from NIL to an address "1" to have the received data in the form of cells written in the CELL section starting from the address "1", and the linking cell address (PNEXT section) is read. Next, as a next stage address "j" is appointed, the received data in the form of cells are written in a CELL section starting from an address "j", and the linking cell address (PNEXT section) is read. Next, as a next stage address "jj"

is appointed, the received data in the form of cells are written in a CELL section starting from the address "ij", and the linking cell address (PNEXT section) is read. Since at this time the record shows that no following link address is present (NIL), it is meant that the data buffer forming the list for six cells has been fully used.

Figure 22:
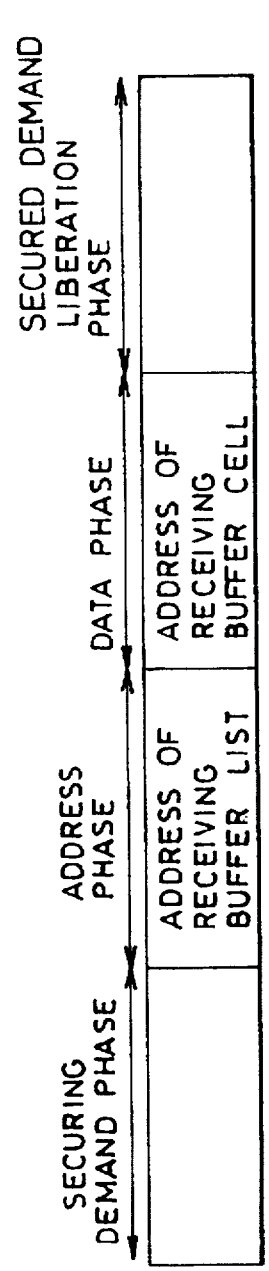
FIG. 22 is an explanatory view for a communication format between the port receiving means and the storage means of the receiving buffer in the fifth embodiment of FIG. 18.
Figure 23:
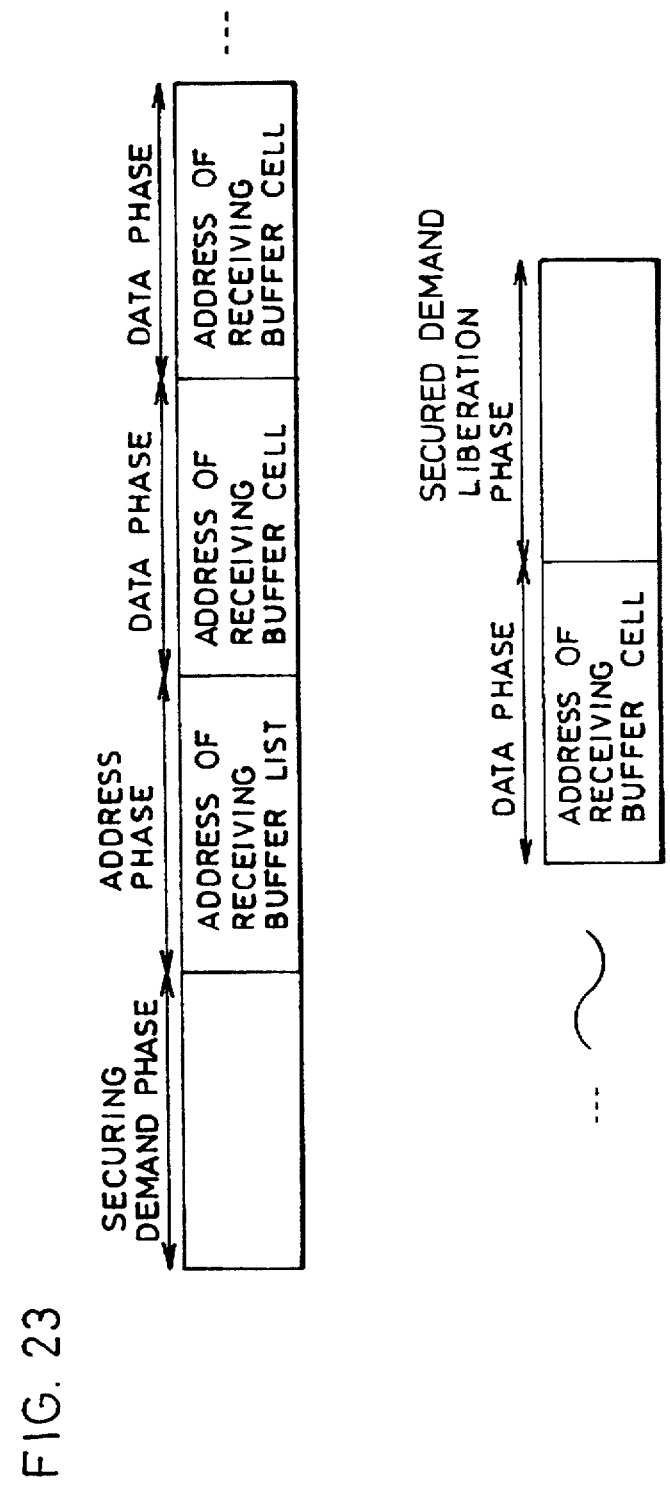
FIG. 23 is an explanatory view for a further communication format between the port receiving means and the storage means of receiving buffer in the fifth embodiment of FIG. 18.

When an aspect of the communication between the port receiving means 1 and the storage means of receiving buffer 2 is shown on an axis of time, the foregoing embodiment requires, for taking up an address of the receiving buffer, a securing demand phase, an address phase, a data phase, and a secured demand liberation phase, as in FIG. 22, whereas in the present embodiment, as shown in FIG. 23, "N" addresses of receiving buffer cell for the addresses of receiving buffer list are taken up at one time so that, when executed "N" times, the securing demand phase, address phase and secured demand liberation phase for (N−1) times can be omitted to shorten the communicating time as a whole. That is, the number of access time of the receiving buffer 3 can be reduced, and a required execution time of the data transfer of the respective port receiving means 1 with respect to the storage means of receiving buffer 2 is shortened.

Accordingly, it should be appreciated that, according to the present invention, an inexpensive switching device for the ETHERNET can be provided by using commonly throughout the device the receiving buffer for storing the received data from the ports of the respective ETHERNET segments as well as the address filter means for determining to which port the transmission should be made.

Further, according to one feature of the present invention, there is provided an arrangement for reducing the delay of packet by enabling the transmission of broadcast packet without requiring in particular the synchronism between the respective ports.

Figure 24:
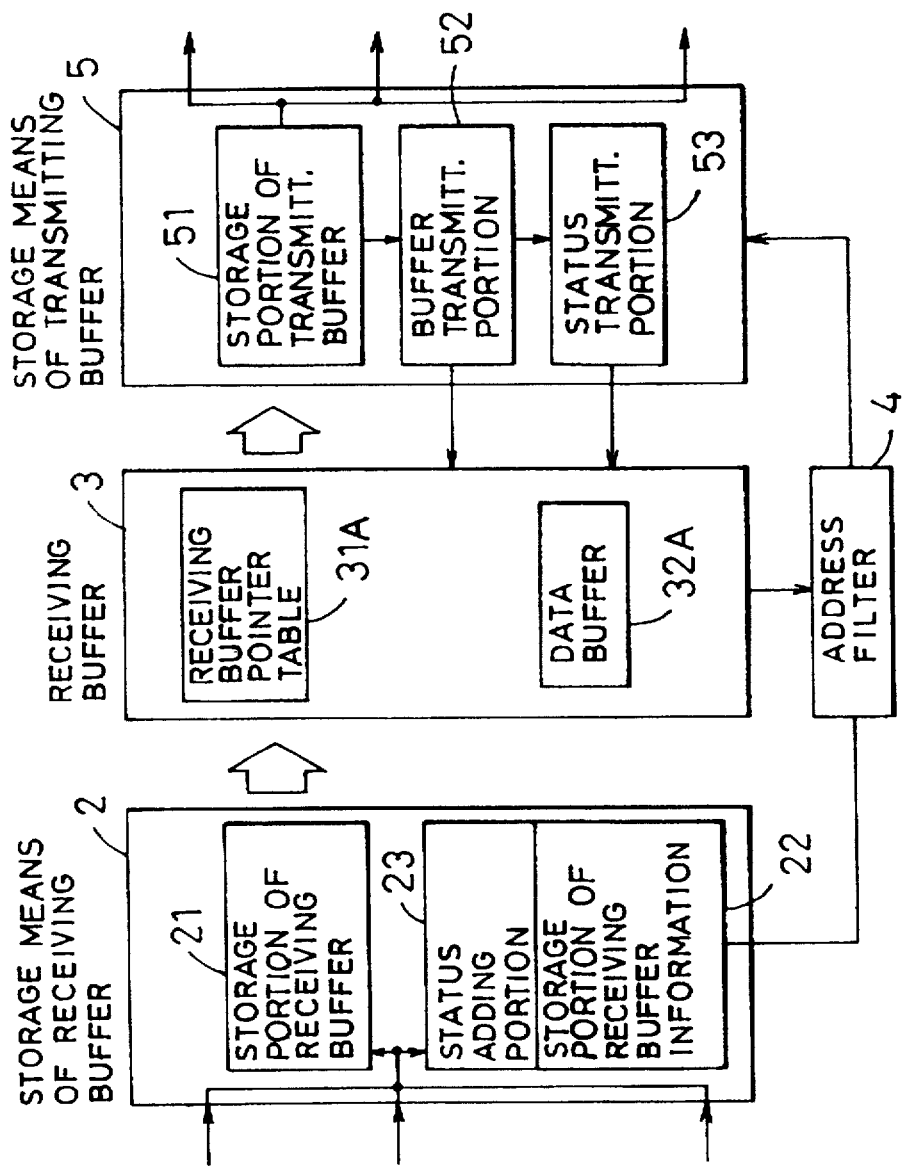
FIG. 24 is a fragmentary block diagram of the switching device for the LAN in a sixth embodiment according to the present invention.

This arrangement shall be described in the following with reference to a sixth embodiment shown in FIG. 24. In the present embodiment, the storage means of receiving buffer 2 includes a receiving buffer storage section 21 for storing the packet once stored asynchronously in the port receiving buffer 12 now in the receiving buffer 3 after being synchronized, a storage portion of receiving buffer information 22 for storing in the address filter 4 such receiving buffer information as storing addresses at the receiving buffer 3 of the packet or receiving port number and the like, and a status adding portion 23 for adding to the packet a status field indicating the transmission process information.

Here, the status adding portion 23 is arranged for adding to the head of a packet format IP of ETHERNET a status field SF representing the status (transmission processing information) as shown in FIG. 25, and this status is to provide, in an event where the number of ports is "n", respective bit numbers "0" through "n−1" to the ports P of port numbers "0" through "n−1" in correspondence to each other as shown in FIG. 26, and is noted to the respective bits as "0" (transmission incomplete) or "1" (transmission completed). Further, a band from the receiving buffer storage section 21 to the receiving buffer 3 is set to be sufficiently larger than a band from the port receiving buffer 12 to the receiving buffer storage section 21, so that the packet is enabled to be stored in the receiving buffer 3 without loss, with a small buffer value (required buffer value for synchronizing the packet incoming asynchronously with the operation of the receiving buffer storage section 21) set for the port receiving buffer 12.

Referring back to FIG. 24, the transmitting buffer storage means 5 includes a transmitting buffer storage section 51 for storing the packet in the port transmitting means 6 on the basis of the information from the address filter means 4, a buffer emitting portion 52 for returning, upon completion of the storage of the packet in the port transmitting means 6, the storage addresses in the receiving buffer 3 to a receiving buffer pointer 31 in the receiving buffer 3, and a status emitting portion 53 for returning the status to the receiving buffer 3. Here, the status emitting portion 53 is to return the status in the status field SF of the packet as "1" denoting the transmission completed, with respect to a port P which has completed the transmission.

Similarly to the foregoing description with reference to FIG. 1, the port transmitting means 6 comprises the port transmitting buffer 61 for storing the packet to be transmitted, and the transmitting portion 62 as an interface with respect to the ETHERNET segments and for transmitting the packet stored in the port transmitting buffer 61 through the port to ETHERNET. Further, the receiving buffer 3 includes the transmitting buffer pointer table 31A and data buffer 32A, so that the packets input through the respective ports P will be stored at predetermined addresses in the data buffer 32A by means of signals from the storage means of receiving buffer 2, and the single receiving buffer 3 is disposed to be commonly used by the whole of the device. That is, the packets input from the respective ports P are all stored in the data buffer 32A in the receiving buffer 3. In the receiving buffer pointer table 31A, the storage addresses of the packets in the data buffer 32A are set. Further, the receiving buffer pointer table 31A has such ring structure as has been described with reference to FIG. 11 of the foregoing embodiment, and the table from the starting position BEGIN to the terminating position END is effectively utilized. In this case, the cell PHEAD indicates the head of vacant cells. At the receiving buffer storage section 21, an address for the storage is secured from the receiving buffer pointer table 31A, and the packet is stored at an address indicated by the appointed PHEAD.

Further, the address filter means 4 in the present embodiment reads from the storage portion of receiving buffer information 22 the port number at which the packet has been received and the storage addresses at the data buffer 32A in the receiving buffer 3, and further reads from the receiving buffer 3 on the basis of the storage addresses only the transmitting source address and transmitting destination address, such address table as has been shown in FIG. 5 of the foregoing embodiment is thereby prepared, and it is ascertained by reference to this table that the equipment (terminal) of which address is connected to which port P. This single address filter means 4 is also provided to be commonly used by the whole of the device, similar to the receiving buffer 3.

Figure 27:
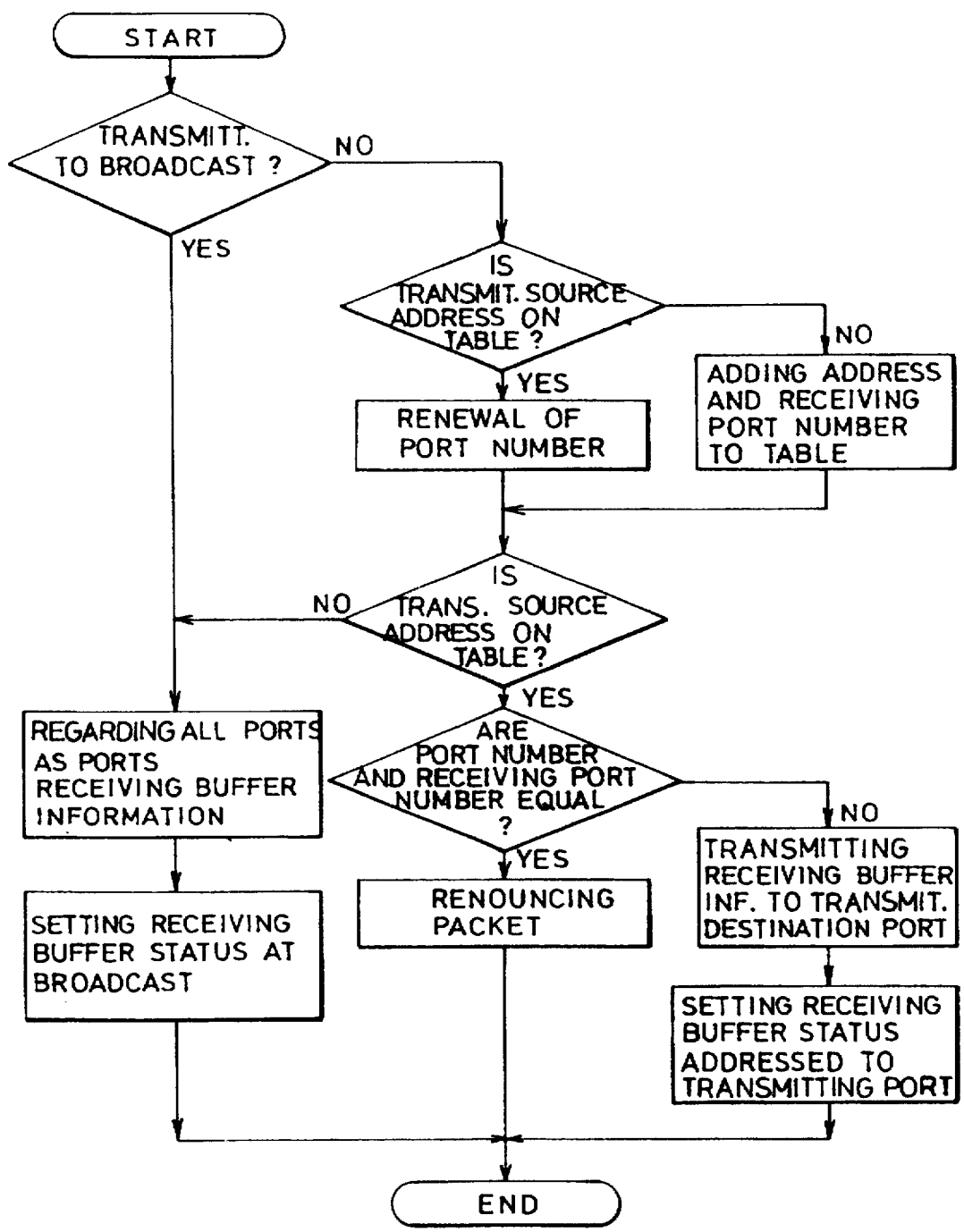
FIG. 27 is a flow chart showing the operation of the address filter means in the sixth embodiment of FIG. 24.

A processing sequence of the address filter means 4 shall be explained here with reference to a flowchart shown in FIG. 27. First, it is investigated whether or not the receiver of the packet is of the broadcast. When the result is "yes", all of the ports except the receiving port are made to be the receivers, and the status of the status field SF added to the packet is set to be the broadcast, that is, all bits other than that corresponding to the port which has received the packet are made to be "0" (transmission incomplete). When the investigation result is "no", the address of the transmitter of the packet stored in the receiving buffer 3 within the address table and, in the absence of such address, the particular address and receiving port number are newly registered at the address table. In an event where the transmitting source address is found but the port number differs from the receiving port number registered in the address table, it is regarded that the equipment has moved and the connection port has been altered, and the receiving port number is re-registered at a position of the port number. Further, the equipment processing to the address study of the bridge as the aging or the like is performed. Next, it is investigated if the address table includes the transmitting destination address. When the transmitting destination address is absent, it is impossible to specify to which port the packet is to be transmitted, and all of the ports except the receiving port are made to be the receivers, and the status added to the data is made to be the broadcast, that is, all bits other than that corresponding to the port which has received the packet are made to be "0" (transmission incomplete). When the transmitting destination address is present, the port number corresponding to the transmitting address is compared with the receiving port number. In the case of inconsistency, the particular port number is made to be the receiver, the packet in the receiving buffer is transmitted to the transmitting destination port, and the status of the corresponding bit transmitting destination port of the status field SF added to the packet is made "1" (transmission complete). In the event of coincidence between the port number and the receiving port, the communication is the one on the same segment and is not required to be transmitted to any other port, and the particular packet is deleted from the receiving buffer 3 to be renounced.

When the transmitting destination port is ascertained, except for the case of being renounced at the address filter means 4, the stored address and transmitting destination port number in the receiving buffer 3 are sent by the address filter means 4 to the transmitting buffer storage means 5, and this transmitting buffer storage means 5 transfers the contents of the packet from the receiving buffer 3 to the port transmitting buffer 61 in the port transmitting means 6 of the transmitting destination port. From the port transmitting means 6, the packet in the port transmitting buffer 61 is transmitted through the transmitting portion 62 as the interface with respect to the ETHERNET segment to the equipment (terminal) having the transmitting destination address. As the packet is transmitted, the buffer emitting portion 52 returns the stored address to the receiving buffer pointer 31, and the transmission of the one packet is completed.

Referring more in detail for promotion of better understanding of the present embodiment, it is assumed here that the port P to which the terminal having the transmitting destination address of the packet input from the terminal to the switching device SW having eight ports is connected is a #3 port. In this event, the status adding portion 23 in the storage means of receiving buffer 2 causes the status of #3 bit in the status field SF to become "0" (transmission incomplete) as shown in FIG. 28, while other bits are made to be status "1" (transmission completed), and such status is added to the receiving packet. The packet to which the status field SF is added is stored at a predetermined address (the address appointed by the receiving buffer pointer 31) in the data buffer 32A of the receiving buffer 3, by the receiving buffer storage section 21. At the transmission buffer storage means 5, the status of the packet is read out of the stored address of the packet sent from the address filter means 4, and contents of the packet are transferred from the receiving buffer 3 to the port transmitting buffer 61 in the port transmitting means 6 having the #3 port number in correspondence to the #3 bit describing "1" denoting the transmission completed state. Upon completion of the transmission from the transmitting portion 62 for the packet, the content of the #3 bit in the status field SF is altered to "0", denoting the transmission incomplete state. In an event when the status of all bits in the status field SF indicates the transmission complete state here, the storage address of the packet is returned from the buffer emitting portion 52 to the receiving buffer pointer 31.

Next, an operation in the case when the receiver of a packet input from the port P of a #6 port is the broadcast shall be explained. In this case, the status adding portion 23 of the storage means of receiving buffer 2 causes the status of #6 bit to be "1" (transmission completed) and the status of all other bits to be "0" (transmission incomplete), and such status field is added to the received packet. Then, the packet with the thus added status field SF is stored at a predetermined address (appointed by the receiving buffer pointer 31) in the data buffer 32A of the receiving buffer 3, by the receiving buffer storage section 21. At the transmitting buffer storage means 5 of the respective ports P, the status of the packet is read out of the storage address of the packet sent from the address filter means 4, and the packet contents are transferred from the receiving buffer 3 to the port transmitting buffer 61 in the port transmitting means 6 having #5 port in correspondence to the #5 bit describing "0" of the transmission incomplete state. Upon completion of the transmission of the packet from the transmitting portion 62, the content of the #5 bit in the status field SF is altered to "1" denoting the transmission completed state. Here, the status of all bits in the status field SF is not yet made to be of the transmission completed state, and only the status is returned from the status emitting portion 53 to the receiving buffer 3. In the same manner, the transmission processing is executed at every port in the sequence of, for example, #0, #3, #2, #4, #7 and #1, the status of all bits in the status field SF are made to denote the transmission completed state upon completion of the transmission for the last #1 port, and the storage address of the packet is returned from the status returning means to the receiving buffer pointer 31.

Thus, in the present embodiment, it is enabled to realize the processing of the broadcast packet without performing the synchronization.

Figures 29, 30:
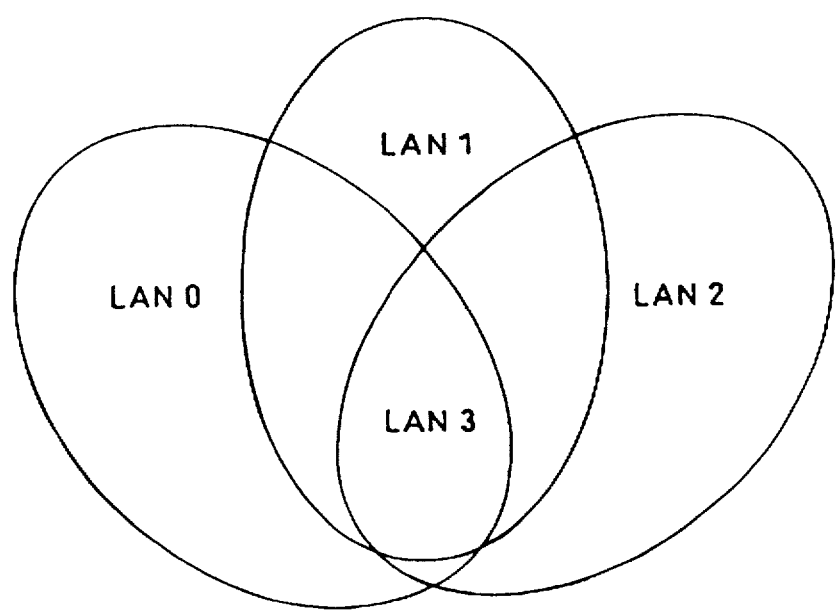
FIG. 29 is a format showing the status field in the sixth embodiment of FIG. 24.
FIG. 30 is a model diagram showing a grouped state of LANs in the sixth embodiment of FIG. 24.
Figures 31, 32:
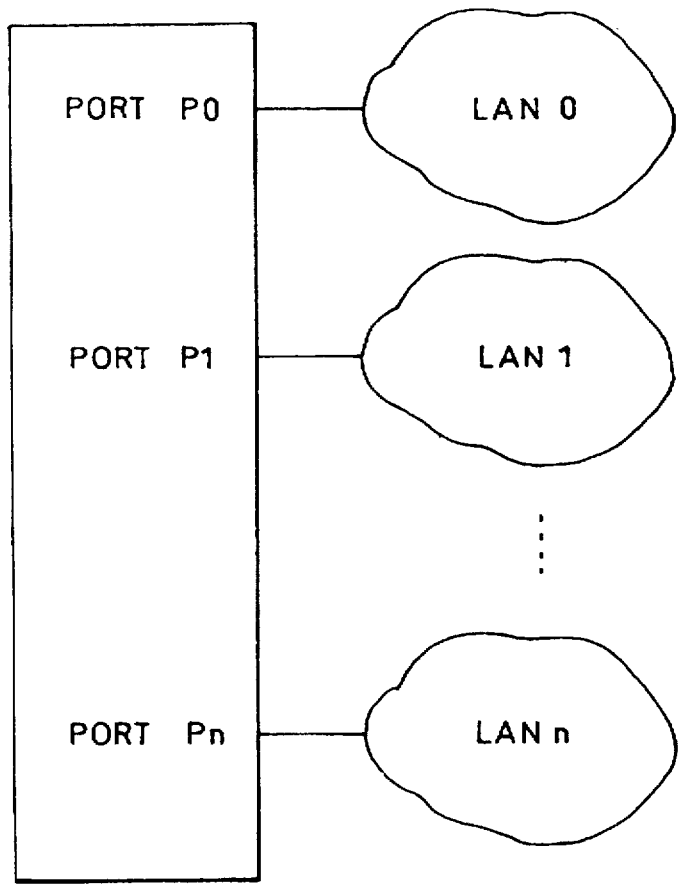
FIG. 31 is a model diagram showing a connecting state between the LAN and the switching device in the sixth embodiment of FIG. 24.
FIG. 32 is a format diagram showing a status field for explaining the operation of a seventh embodiment according to the present invention.

A seventh embodiment as another working aspect of the processing of the broadcast packet shall now be explained. Referring to FIG. 30, it is assumed here that such three LANs as LAN0, NAN1 and LAN2, for example, for respective different fields are present, and their overlapping part is made a LAN3 for common use by the respective fields. In this case, the presence of LAN3 to be commonly used by the respective fields allows any direct communication between the respective LANs of the different fields, such as between LAN0 and LAN1, to be unnecessary. That is, the broadcast packet in LAN0 may be transmitted only to LAN3 and may not be transmitted to LAN1 or LAN2. Here, the respective LANs are grouped so that the broadcast packets in LAN0–LAN2 are transmitted only to LAN3, and the broadcast packets in LAN3 are transmitted to each of LAN0, LAN1 and LAN2. Further, as shown in FIG. 31, the respective LAN0 through LAN3 are connected to the respective LAN ports P1–Pn of the switching device for the LAN according to the present invention. In the address filter means 4, there is provided a status field table showing the status for the respective ports P corresponding to the transmitter port. When the broadcast packet is input, only the bit corresponding to the port to which the packet is to be transmitted is made to be "0" (transmission incomplete) while other bits are made "1" (transmission completed). In other words, the broadcast packet input through the ports P0–P2 may only be transmitted to the port P3, while the broadcast packet input from the port P3 may only be transmitted to the ports P0–P2, so that the status of the ports P0–P2 is set to be "0" only at the bits corresponding to the port P3, and the status of the port P3 is set to be "1" at the bits corresponding to the ports P0–P2. Such status field table is arranged for being set by the users.

In processing the broadcast packet in the present embodiment, the status field corresponding to the transmitter port (the port at which the packet is received) is obtained upon receiving the broadcast packet at the port P, by means of the status field table at the address filter means 4 as shown at steps #1 and #2 of the flowchart of FIG. 33, and the status field thus obtained is set to the receiving buffer status. In this manner, the foregoing LANs can be easily grouped only by partly altering the processing at the address filter means 4.

An eighth embodiment as still another working aspect of the processing of the broadcast packet shall be explained. In the present embodiment, such three LANs as LAN0, LAN1 and LAN2 are present for the different fields, as in the foregoing embodiment, the common LAN3 is used for the common employment through the respective fields, and it is required to change the receiver of the broadcast packet for every terminal in the LANs in such sequence that a terminal A connected to LAN0 makes the transmission to LAN1 and LAN3, and a terminal B connected to LAN0 makes the transmission to LAN2 and LAN3. In this case, the address filter means 4 is provided for each of the terminals A and B with a status field table showing corresponding status to the address of the terminals A and B. This status field table is also arranged for being set by the users.

In processing the broadcast packet in the present eighth embodiment, the address filter means 4 causes, upon receiving at the port P the broadcast packet and as shown by steps #3 and #4 in a flowchart of FIG. 35, the status field with respect to the address of the transmitting terminal to be obtained by the status field table, and this status field obtained is set to the receiving buffer status. With this arrangement, it is possible to have the foregoing LANs grouped only by partly modifying the processing at the address filter means 4.

In the above described sixth through eighth embodiments, it is possible to improve the efficiency of use of the buffer by means of the one concentrative and larger buffer and the plurality of smaller buffers with respect to the respective ports P for absorbing the asynchronism, and consequently to reduce the required buffer value for the whole of the device.

What is claimed is:

1. A switching device for LAN comprising:
   a plurality of port receiving means connected to respective ETHERNET segments for receiving and buffering a packet,
   a storage means of a receiving buffer for receiving the packet from the respective port receiving means,
   a receiving buffer for storing the packet from the storage means of the receiving buffer,
   the storage means of the receiving buffer providing a storage address upon storing the packet at the receiving buffer,
   an address filter means connected to the storage means of the receiving buffer for discriminating a transmitting destination port of the received packet in view of a transmitting source address and a transmitting destination address read out of the receiving buffer on the basis of the storage address transmitted from the storage means of the receiving buffer,
   a storage means of a transmitting buffer connected to the receiving buffer and the address filter means for receiving the packet from the receiving buffer and receiving the storage address and transmitting a destination port of the packet, and
   a plurality of port transmitting means each including a port transmitting buffer and connected to the storage means of the transmitting buffer and to respective ETHERNET segments,
   the port transmitting storage means transmitting the packet from the receiving buffer to the port transmitting buffer in one of the port transmitting means which is of the transmitting destination port to which the packet is transmitted from the receiving buffer as determined on the basis of the packet storage address and the transmitting destination port.

2. The device according to claim 1 wherein the port receiving means is provided with a local address filtering means for discriminating whether or not the packet is of a communication within the ETHERNET segment connected to the port of a particular one of the port receiving means and renouncing the packet when the same is of the communication within the segment.

3. The device according to claim 1 wherein the storage means of the receiving buffer is provided with means for storing the packet in the receiving buffer as divided into fixed lengths.

4. The device according to claim 1 wherein the storage means of the receiving buffer is provided with means for discriminating a required receiving buffer value from an information of the length of the packet obtained from the port receiving means and storing the packet in the receiving buffer.

5. The device according to claim 1 wherein the receiving buffer has a list structure including blocks of a fixed length, the storage means of the receiving buffer is provided with means for storing in the receiving buffer of the list structure the packet as divided into portions of a fixed length, and the storage means of the transmitting buffer includes means for reading the packet out of the receiving buffer of the list structure.

6. The device according to claim 5 wherein the port receiving means is provided with a receiving buffer list storing means for storing a plurality of addresses of a receiving buffer cell of the receiving buffer formed as a plurality of cells.

7. A switching device for LAN comprising:
   a plurality of port receiving means each having a port and connected through the port to respective ETHERNET segments for receiving and buffering packets,
   a storage means of a receiving buffer for storing in the receiving buffer at a next stage the packet from the port receiving means with an addition to the packet a status field denoting a transmission processing information,
   the receiving buffer including a data buffer for storing the packet by means of the storage means of the receiving buffer and a receiving buffer pointer table denoting the storage addresses,
   an address filter means for discriminating a transmitting destination port of the packet with a transmitting source address and transmitting a destination address of the packet read out of the receiving buffer on the basis of the storage address transmitted from the storage means of the receiving buffer and transmitting to a storage means of a transmitting buffer at a next stage the storage address and transmitting destination port of the packet,
   the storage means of the transmitting buffer operable for transferring the packet from the receiving buffer on the basis of the storage address and transmitting destination port of the packet from the address filter means, returning the transmission processing information in the status field of the packet to the data buffer as modified by a transmission information from the next stage port transmitting means and, upon completion of all transmission, returning a receiving buffer pointer to the receiving buffer pointer table, and a plurality of port transmitting means for transmitting the packet transferred from the receiving buffer through the port to the ETHERNET segment to which the port is connected.

8. The device according to claim 7 wherein the port receiving means and port transmitting means are provided for every port, and other constituents are disposed respectively to be commonly used for the whole of the device.

9. The device according to claim 7 wherein the address filter means is provided with a status field table denoting a transmission processing information for every port so that, when the receiver is of a broadcast, the status field corresponding to the port of the transmitter is set by referring at the storage means of the receiving buffer to the status field table.

10. The device according to claim 7 wherein the address filter means is provided with a status field table denoting the transmission processing information for every address of the respective transmitter side segments so that, when the receiver is of a broadcast, the status field corresponding to the address of the transmitter side segment is set by referring at the storage means of the receiving buffer to the status field table.

* * * * *